Aug. 11, 1953  O. E. HILL  2,648,171
MULTIPLE WHEEL GRINDING MACHINE
Filed Dec. 1, 1951  11 Sheets-Sheet 1

Inventor,
OIVA E. HILL
By Harold W. Eaton
Attorney

Aug. 11, 1953      O. E. HILL      2,648,171
MULTIPLE WHEEL GRINDING MACHINE
Filed Dec. 1, 1951      11 Sheets-Sheet 2
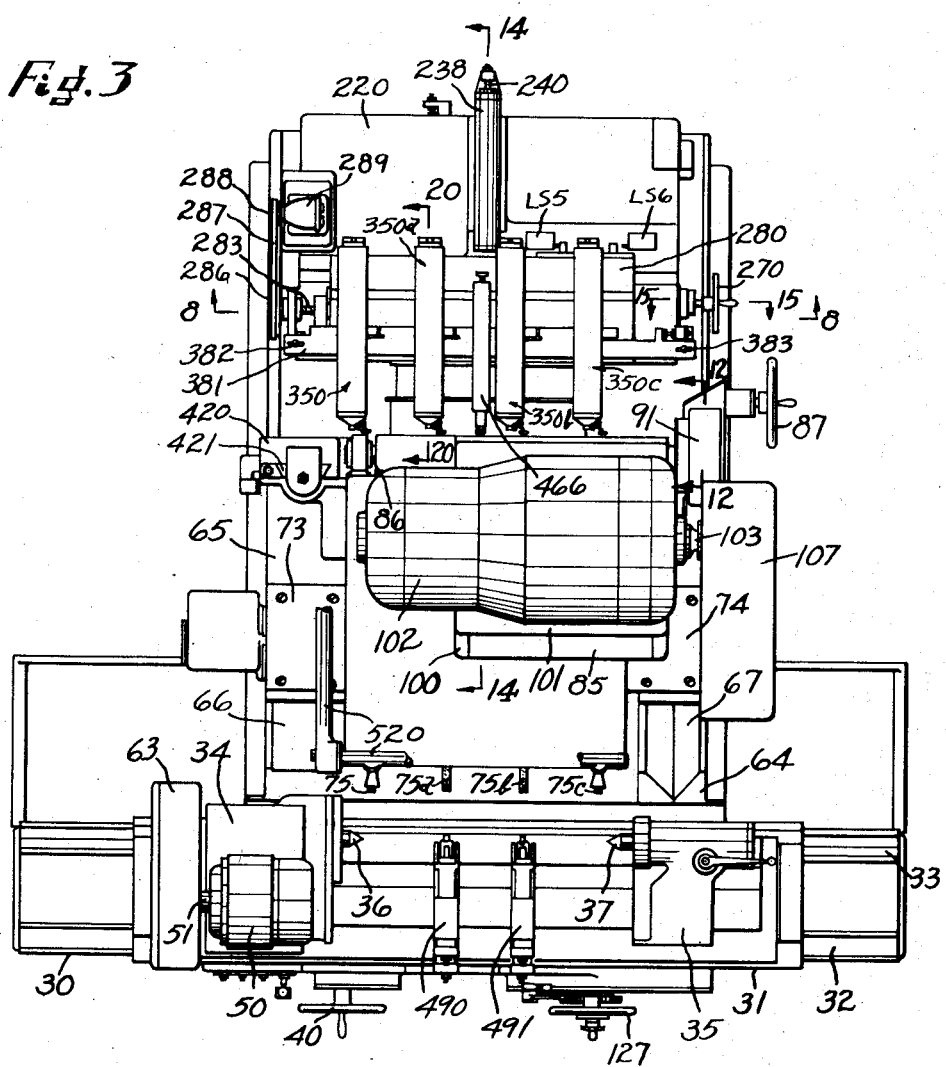
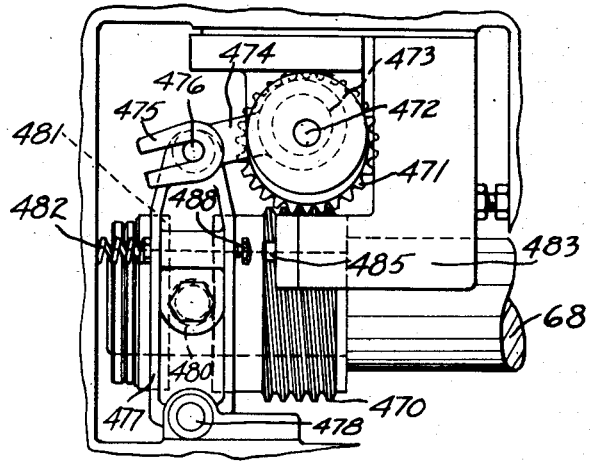
Inventor
OIVA E. HILL
By Harold W. Eaton
Attorney Aug. 11, 1953 — O. E. HILL — 2,648,171
MULTIPLE WHEEL GRINDING MACHINE
Filed Dec. 1, 1951 — 11 Sheets-Sheet 3

Inventor
OIVA E. HILL
By Harold W. Eaton
Attorney

Aug. 11, 1953 — O. E. HILL — 2,648,171
MULTIPLE WHEEL GRINDING MACHINE
Filed Dec. 1, 1951 — 11 Sheets-Sheet 5

Inventor
OIVA E HILL

By Harold W. Eaton
Attorney

Aug. 11, 1953     O. E. HILL     2,648,171
MULTIPLE WHEEL GRINDING MACHINE

Filed Dec. 1, 1951     11 Sheets-Sheet 7

Inventor
OIVA E. HILL

By Harold W. Eaton
Attorney

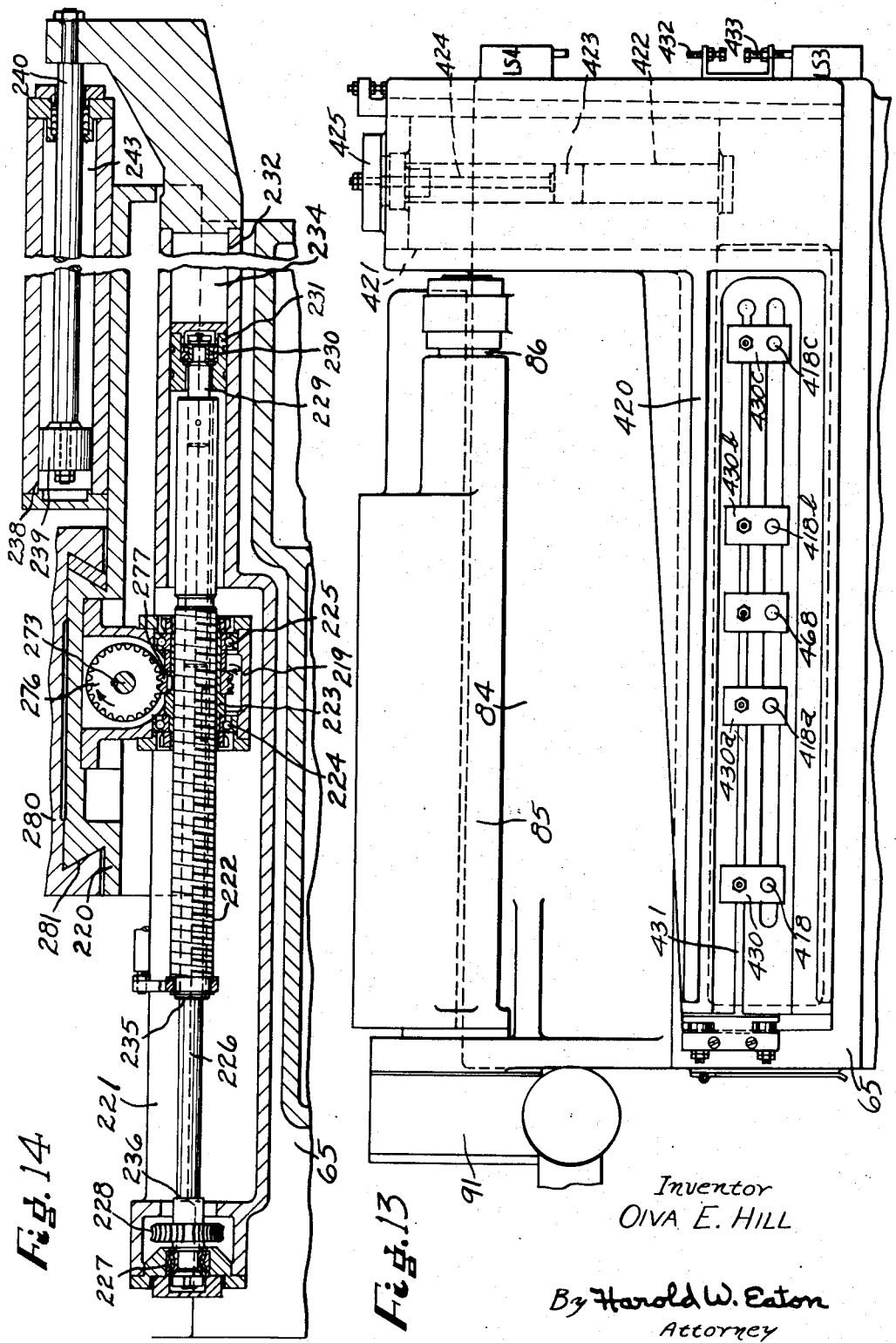

Aug. 11, 1953     O. E. HILL     2,648,171
MULTIPLE WHEEL GRINDING MACHINE
Filed Dec. 1, 1951     11 Sheets-Sheet 9
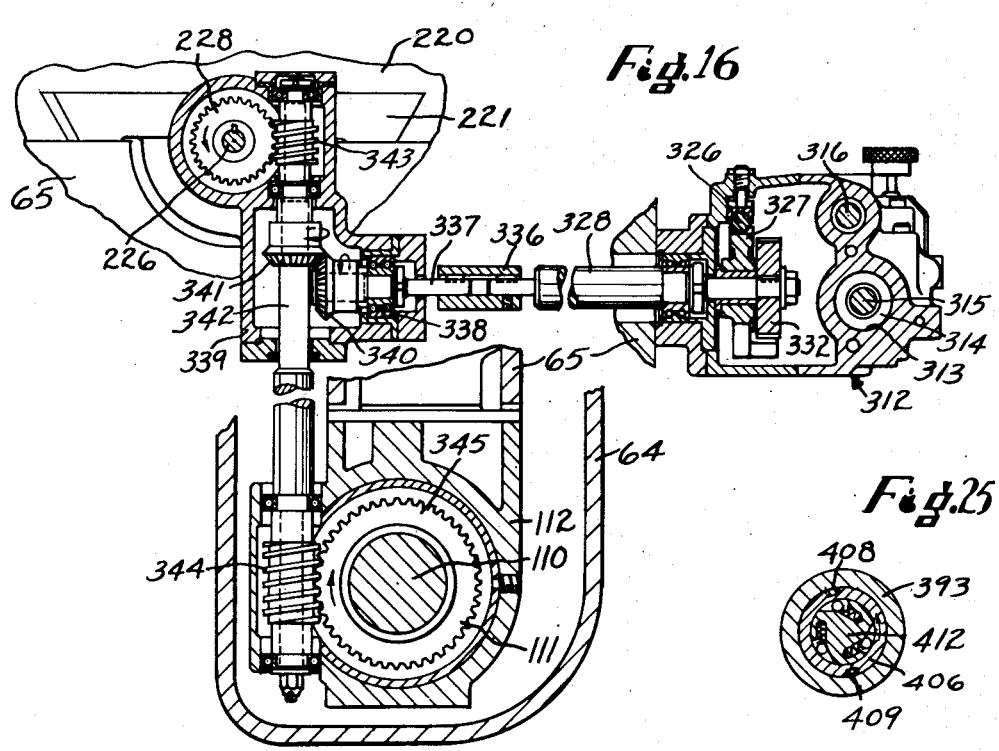
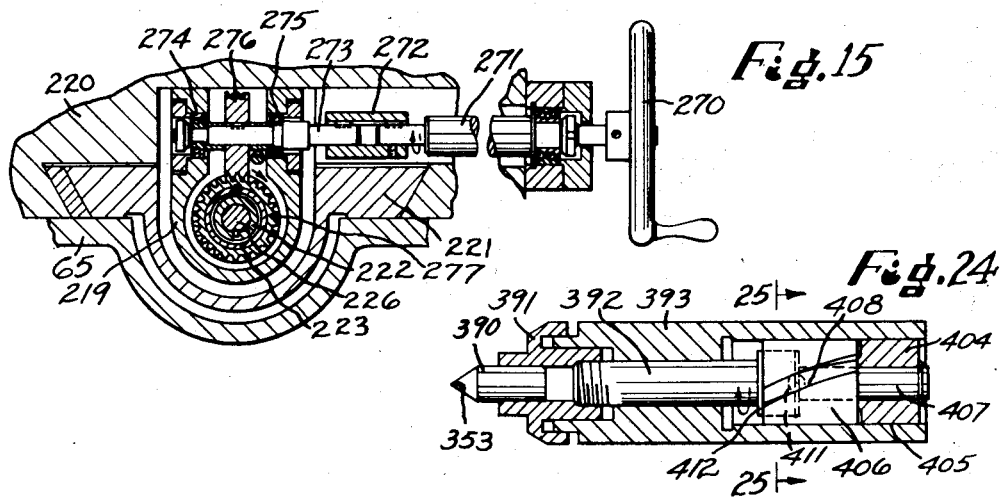
Inventor
OIVA E. HILL
By Harold W. Eaton
Attorney Aug. 11, 1953 O. E. HILL 2,648,171
MULTIPLE WHEEL GRINDING MACHINE
Filed Dec. 1, 1951 11 Sheets-Sheet 10
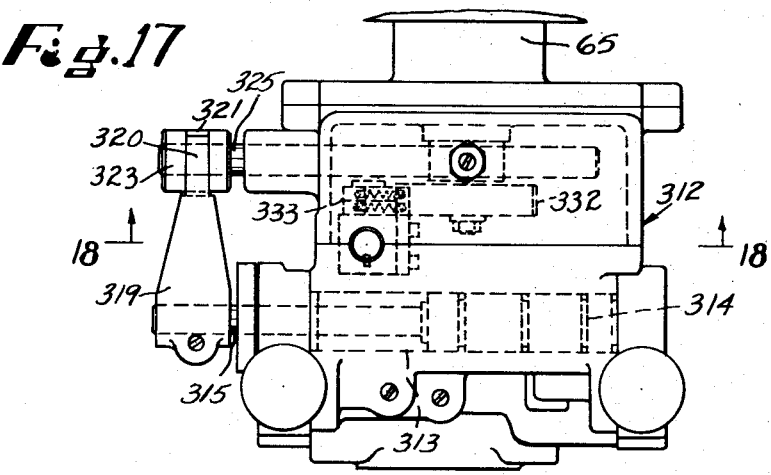
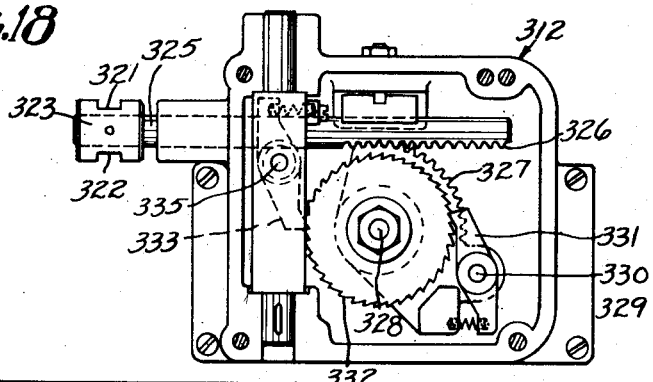
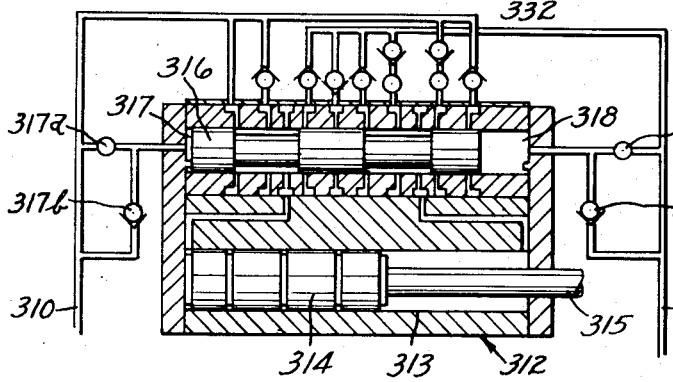
Inventor
OIVA E. HILL
By Harold W. Eaton
Attorney Aug. 11, 1953   O. E. HILL   2,648,171
MULTIPLE WHEEL GRINDING MACHINE
Filed Dec. 1, 1951   11 Sheets-Sheet 11
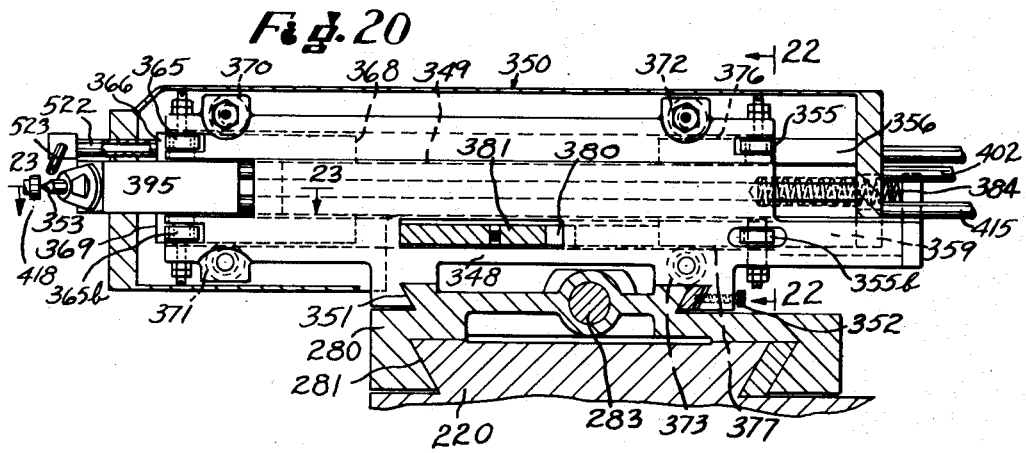
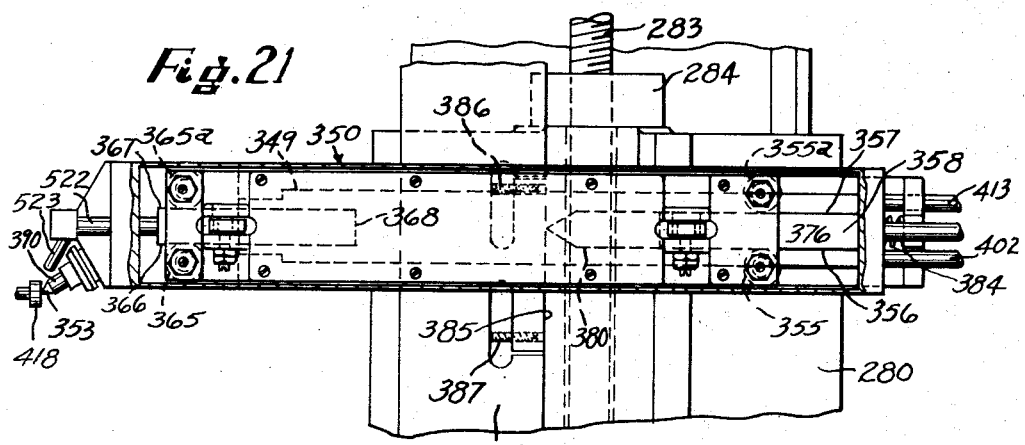
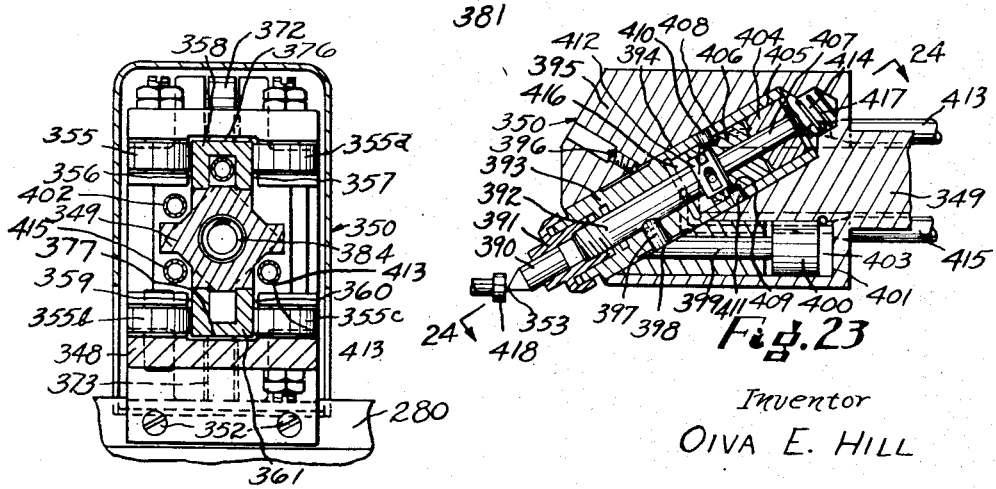
Inventor
OIVA E. HILL
By Harold W. Eaton
Attorney Patented Aug. 11, 1953

2,648,171

UNITED STATES PATENT OFFICE 2,648,171

MULTIPLE WHEEL GRINDING MACHINE

Oiva E. Hill, West Boylston, Mass., assignor to Norton Company, Worcester, Mass., a corporation of Massachusetts Application December 1, 1951, Serial No. 259,372

17 Claims. (Cl. 51—5)

The invention relates to grinding machines, and more particularly to a cylindrical-type grinding machine.

One object of the invention is to provide a simple and thoroughly practical machine for simultaneously grinding a plurality of spaced cylindrical portions on a workpiece. Another object is to provide an automatically actuated truing mechanism for truing a grinding wheel after a predetermined number of workpieces have been ground. Another object is to provide a truing apparatus with an automatically actuated indexing mechanism for indexing the diamond or truing tool after each truing operation. Another object is to provide a gauging mechanism automatically to re-set the diamond or truing tool after each truing operation and indexing thereof.

A further object of the invention is to provide a truing apparatus having a plurality of diamonds or truing tools controlled by a forming bar simultaneously to true the peripheries of a plurality of spaced grinding wheels. Another object is to provide an electrically controlled truing apparatus having an automatic cycle of operation which may be initiated manually or automatically after a predetermined number of workpieces have been ground. Another object of the invention is to provide a gauging mechanism automatically to re-set all of the diamonds or truing tools after an indexing mechanism thereof. Other objects will be in part obvious or in part pointed out hereinafter.

One embodiment of the invention has been illustrated in the drawings in which:

Fig. 3 is a plan view of the machine;

Fig. 9 is a fragmentary plan view, on an enlarged scale, of the grinding wheel spindle reciprocating mechanism;

Fig. 11 is a fragmentary horizontal sectional view, on an enlarged scale, taken approximately on the line 11—11 of Fig. 2, through a portion of the mechanism for moving the wheel guard to and from an operative position;

Fig. 12 is a fragmentary vertical sectional view, on an enlarged scale, taken approximately on the line 12—12 of Fig. 3, through a portion of the mechanism for actuating the wheel guard;

Fig. 13 is a fragmentary rear elevation, on an enlarged scale, taken approximately on the line 13—13 of Fig. 2, of the vertically movable truing tool gauge slide.

Fig. 14 is a fragmentary vertical sectional view, on an enlarged scale, taken approximately on the line 14—14 of Fig. 3, through the truing apparatus feeding mechanism;

Fig. 15 is a fragmentary vertical sectional view on an enlarged scale, taken approximately on the line 15—15 of Fig. 3, through the manually operable adjusting mechanism for the truing apparatus cross slide;

Fig. 16 is a fragmentary vertical sectional view, on an enlarged scale, taken approximately on the line 16—16 of Fig. 7, through the feed mechanism compensator;

Fig. 17 is an elevation, on an enlarged scale, of the compensator;

Fig. 18 is a horizontal sectional view, taken approximately on the line 18—18 of Fig. 17, through the compensator;

Fig. 19 is a diagrammatic view of the hydraulic compensator motor;

Fig. 20 is a vertical sectional view, on an enlarged scale, taken approximately on the line 20—20 of Fig. 3, through one of the truing tool units;

Fig. 21 is a plan view of the truing tool unit as shown in Fig. 20, with the top plate broken away to more clearly illustrated construction;

Fig. 22 is a sectional view, on an enlarged scale, taken approximately on the line 22—22 of Fig. 20;

Fig. 23 is a fragmentary sectional view, on an enlarged scale, taken approximately on the line 23—23 of Fig. 20, showing the indexing mechanism for the truing tool;

Fig. 24 is a sectional view, on an enlarged scale, taken approximately on the line 24—24 of Fig. 23, through the truing tool and the indexing mechanism therefor; and Fig. 25 is a cross-sectional view, taken approximately on the line 25—25 of Fig. 24, through the ball clutch portion of the truing tool indexing mechanism.

Figure 1:
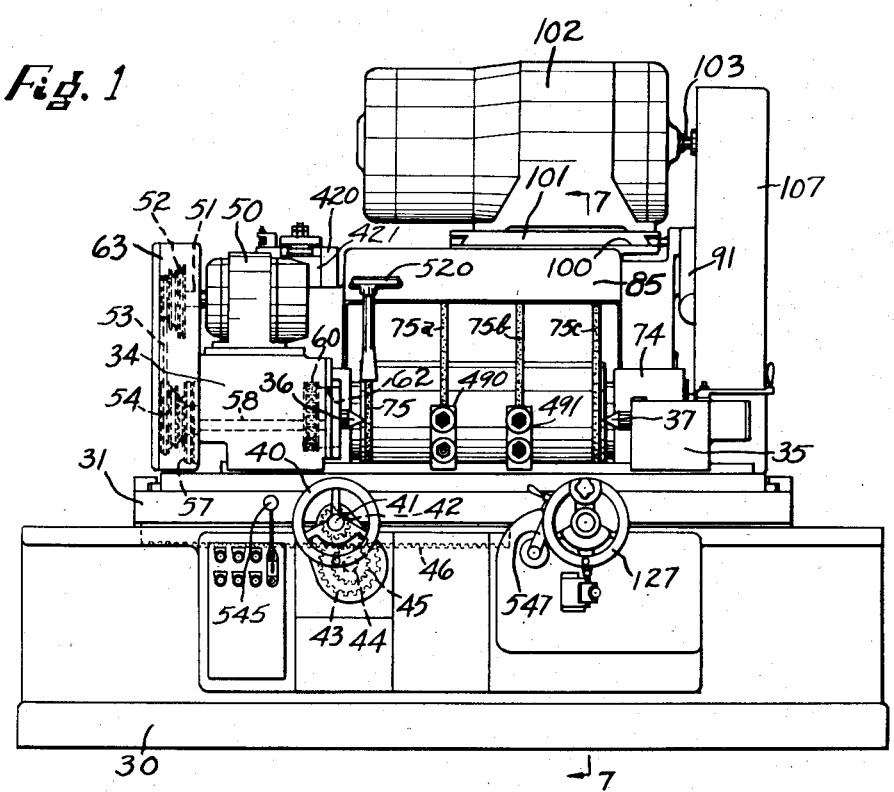
Fig. 1 is a front elevation of the improved grinding machine.

An improved hydraulically operated electrically controlled grinding machine has been illustrated in the drawings comprising a base 30 which supports a longitudinally traversable work supporting table 31. The table 31 is supported on a flatway 32 and a V-way 33 formed on the upper surface of the base 30. The table 31 serves as a support for a headstock 34 and a footstock 35 which are provided with work supporting centers 36 and 37 respectively for rotatably supporting a workpiece for a grinding operation.

The table 31 may be moved longitudinally relative to the base 30 by a suitable traversing mechanism such as for example a manually operable traversing mechanism comprising a hand traverse wheel 40 mounted on a rotatable shaft 41 (Fig. 1). The shaft 41 supports a gear 42 which meshes with a gear 43 mounted on a rotatable shaft 44. The shaft 44 is provided with a gear 45 which meshes with a rack bar 46 depending from the under side of the table 31. It will be readily apparent from the foregoing disclosure that a rotary motion of the hand wheel 40 will be transmitted through the gear mechanism above described to impart a longitudinal movement to the table 31. The direction of rotation of the hand wheel 40 serving to determine the direction of movement of the table 31.

Figure 2:
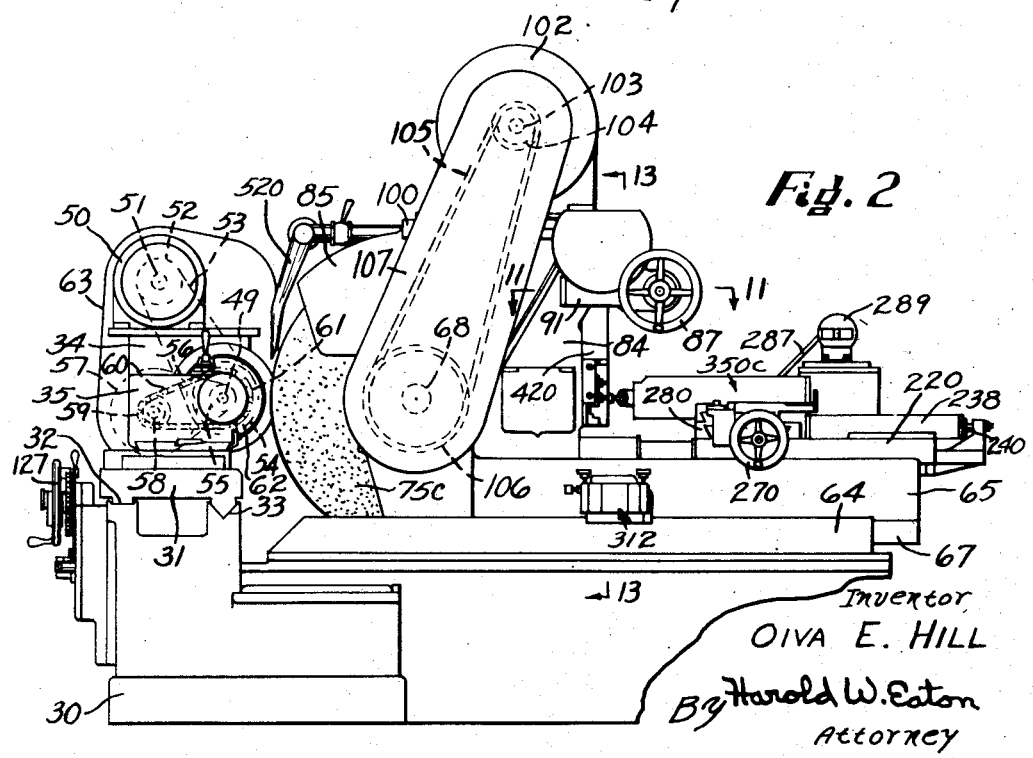
Fig. 2 is a right-hand end elevation of the machine.

The headstock 34 is preferably driven by an electric motor 50 which is mounted on the upper surface thereof. The motor 50 is provided with an armature shaft 51 carrying a stepped V-groove pulley 52. The pulley 52 is connected by a V-belt 53 with a stepped V-groove pulley 54 mounted on a rotatable shaft 49. The shaft 49 is provided with a pulley 55 which is connected by a V-belt 56 with a pulley 57 mounted on a rotatable shaft 58. The shaft 58 is provided with a sprocket 59. The sprocket 59 is connected by a link chain 60 with a sprocket 61 mounted on a headstock spindle 62. The driving mechanism above described is contained within a belt guard 63 (Figs. 1, 2 and 3).

A wheel slide base 64 is fixedly mounted on the machine base 30 and serves as a support for a transversely movable wheel slide 65. The wheel slide base 64 is provided with a flatway 66 and a V-way 67 upon which the wheel slide 65 slides. The wheel slide 65 supports a rotatable grinding wheel spindle 68 in a pair of spaced bearings 69 and 70. The bearings 69 and 70 are in turn supported by a pair of sleeves 69a and 70a respectively. The outer surfaces of the sleeves 69a and 70a are cylindrical in shape and are supported by a semi-cylindrical surface 71 and 72 formed on the wheel slide 65. A pair of removably mounted bearing caps 73 and 74 surround the upper portion of the sleeves 69a and 70a respectively and are removably fastened to the wheel slide 65 to facilitate removal of the wheel spindle 68. The wheel spindle 68 is arranged to support a plurality of spaced grinding wheels 75, 75a, 75b and 75c. Spacing collars 76, 76a, and 76b are supported by the wheel spindle 68 and serve to position the grinding wheels in the desired spaced relationship with each other. A pair of flanges 77 and 78 are fastened to the wheel spindle 68 by clamping bolts (not shown) to facilitate clamping the grinding wheels and sleeves to the spindle 68.

The grinding wheel assembly is partially surrounded by a wheel guard 84 (Fig. 7) the upper portion 85 of which is pivotally supported on a rock shaft 86 to facilitate movement of the portion 85 to an inoperative position during a wheel changing operation.

A manually operable mechanism is provided for moving the hinged portion 85 of the wheel guard 84 to and from an inoperative position. This mechanism may comprise a hand wheel 87 mounted on a shaft 88 which is rotatably supported in anti-friction bearings 89 and 90. The bearings 89 and 90 are mounted within a housing 91 carried by the wheel slide 65. The shaft 88 (Fig. 11) is provided with a bevel gear 92 which meshes with a bevel gear 93 mounted on the end of a rotatable shaft 94 (Figs. 11 and 12). The shaft 94 is journalled in spaced anti-friction bearings 95 and 96 which are supported within the housing 91. A worm 97 either formed integral with or fixedly mounted on the shaft 94 and meshes with a worm gear 98 (Fig. 12) which is keyed onto the end of the rock shaft 86. The hinged portion 85 of the wheel guard 84 is also keyed to the shaft 86 so that a rotary motion of the hand wheel 87 will be imparted through the mechanism just described to swing the hinged portion 85 to and from an operative position.

Figure 6:
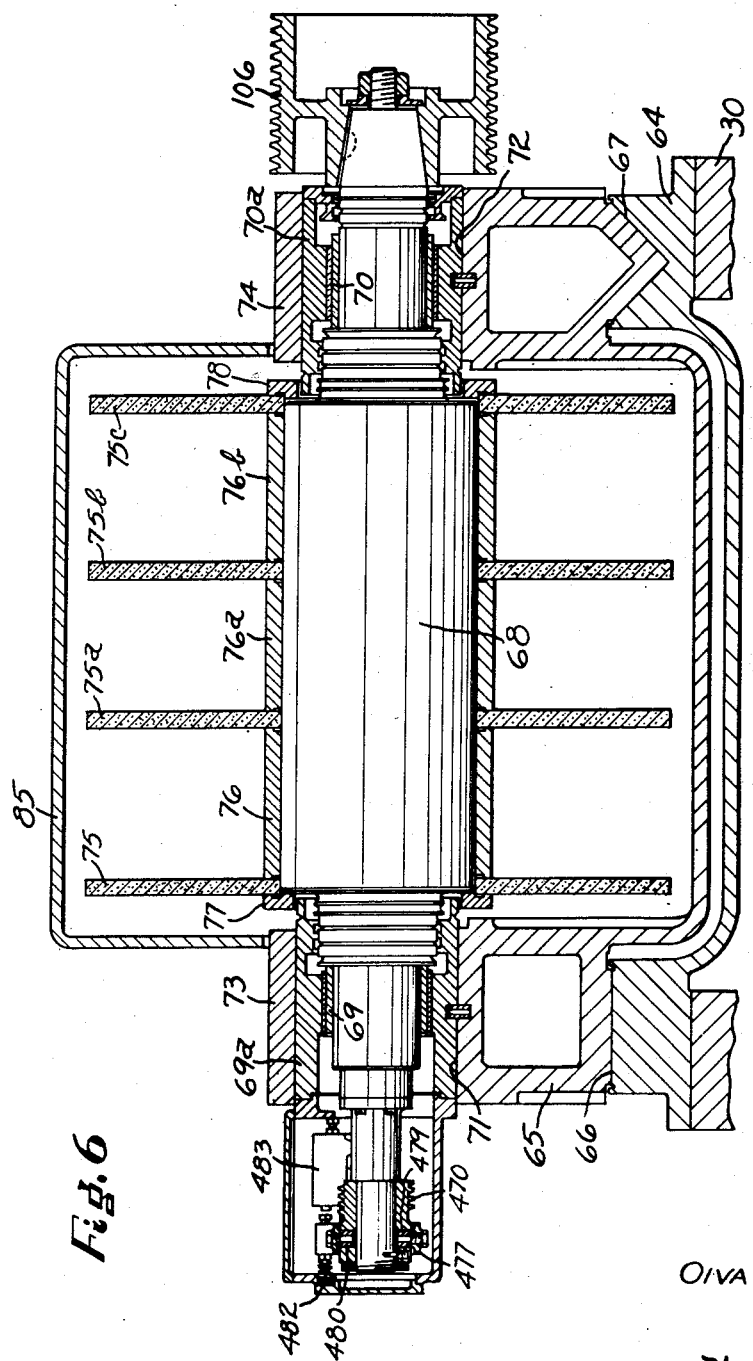
Fig. 6 is a vertical sectional view, on an enlarged scale, through the wheel spindle showing the mounting for the grinding wheels and the reciprocating mechanism therefor.

A suitable driving mechanism is provided for rotating the wheel spindle 68. The hinged portion 85 of the wheel guard 84 is provided with a plane upper surface 100 which serves as a support for a motor slide base 101 which supports an electric motor 102. The motor 102 is provided with an armature shaft 103 (Figs. 1 and 2) having a multiple V-groove pulley 104 fixedly mounted thereon. The pulley 104 is connected by multiple V-belts 105 with a multiple V-groove pulley 106 which is keyed onto the right-hand end of the wheel spindle 68 (Fig. 6). The driving mechanism above described is enclosed within a belt guard 107 (Figs. 1, 2 and 3).

Figure 7:
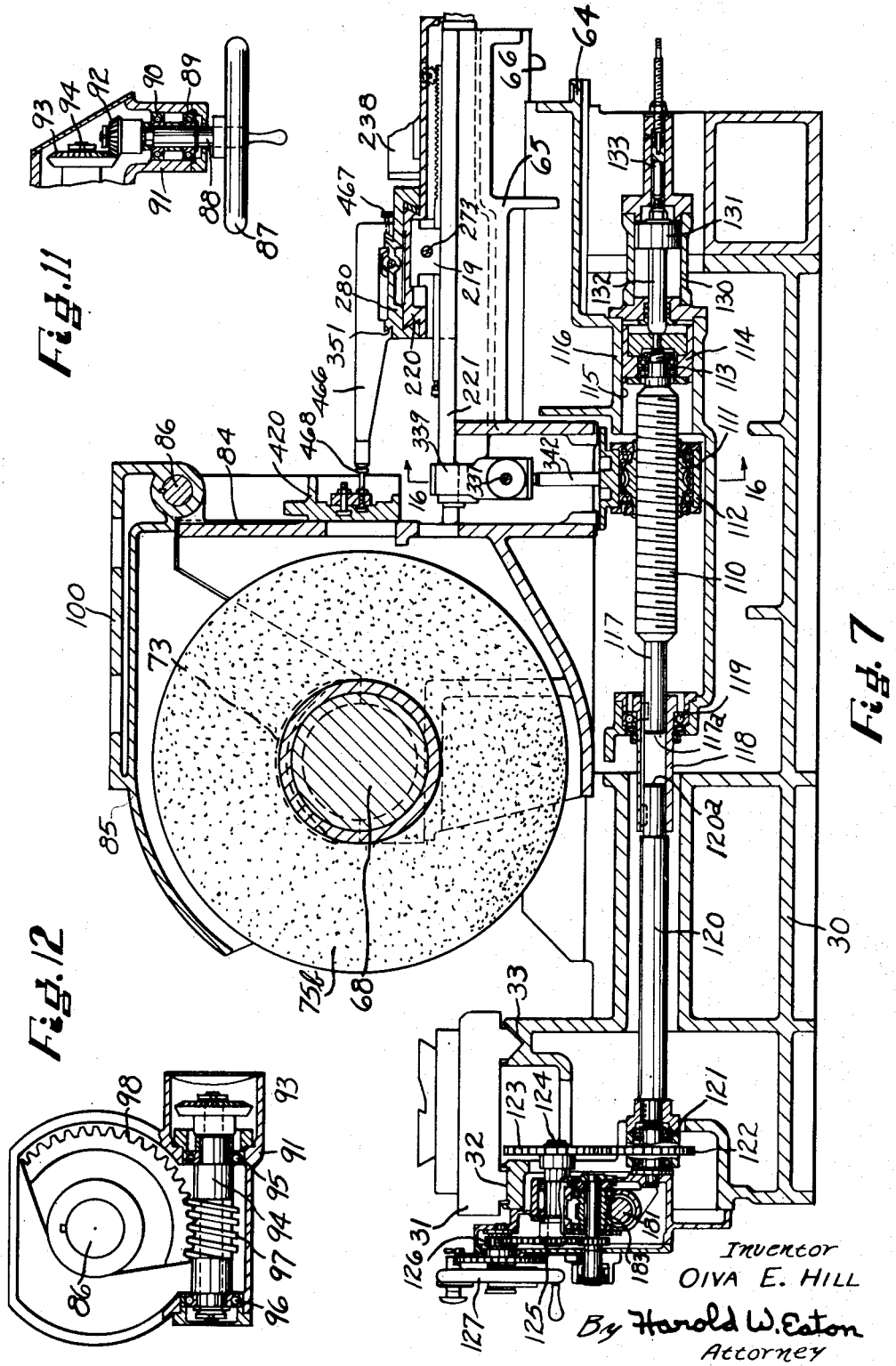
Fig. 7 is a vertical sectional view, on an enlarged scale, taken approximately on the line 7—7 of Figure 1, through the wheel feeding mechanism.

A suitable feeding mechanism is provided for causing a transverse movement of the wheel slide 65 which may comprise a rotatable feed screw 110. A rotatable nut 111 surrounds and meshes with the feed screw 110 and is rotatably supported within a housing 112 depending from the under side of the wheel slide 65 (Fig. 7). The right-hand end of the feed screw 110 is supported in anti-friction bearings 113 carried by a slidably mounted sleeve 114 which is arranged to slide within a cylindrical aperture 115 formed in a housing 116 formed integral with the wheel slide base 64. The left-hand end of the feed screw 110 is provided with a cylindrical portion 117 which is slidably keyed within a rotatable sleeve 118. The sleeve 118 is journalled in an anti-friction bearing 119 carried by the housing 116 on the under side of the wheel slide base 64. A rotatable shaft 120 is slidably keyed within the left-hand end of the sleeve 118. The left-hand end of the shaft 120 is journalled in an anti-friction bearing 121 carried by the base 30. A gear 122 is mounted on the left-hand end of the shaft 120 and meshes with a gear 123 mounted on a rotatable shaft 124. The shaft 124 carries a gear 125 which meshes with a gear 126 which is arranged to be rotated by a manually operable feed wheel 127. It will be readily apparent from the foregoing disclosure that a rotary motion of the hand wheel 127 will be imparted through the mechanism above described to impart a rotary motion to the feed screw 110 and thereby impart a transverse feeding movement to the wheel slide 65. The direction of rotation of the feed wheel 127 will determine the direction of movement of the wheel slide 65.

A hydraulically operated mechanism is provided for rapidly moving the wheel slide 65 to and from an operative position. This mechanism may comprise a cylinder 130 containing a slidably mounted piston 131 which is connected to one end of a piston rod 132. The piston rod 132 and cylinder 130 are arranged in axial alignment with the feed screw 110. The left-hand end of the piston rod 132 (Fig. 7) is connected to the slidably mounted sleeve 114. A dashpot 133 is provided to cushion the rearward movement of the piston 131.

A hydraulic system is provided comprising a fluid pump 134 (Fig. 4) driven by an electric motor 135 (Fig. 5) for supplying fluid under pressure for operating the various parts of the machine. The pump 134 draws fluid through a pipe 136 from a reservoir 137 and forces fluid under pressure through a pipe 138. An adjustable relief valve 139 is connected to the pipe line 138 to exhaust excess fluid under pressure directly to the reservoir 137 in order to maintain a substantially constant pressure within the pressure pipe 138. Fluid under pressure from the pipe 138 passes to a control valve 140. The valve 140 is a piston-type valve containing a slidably mounted valve member 141 having a plurality of valve chambers 142, 143 and 144 formed in the periphery thereof. The slidably mounted valve member 141 is also provided with a central aperture to facilitate passage of fluid therethrough.

Figure 4:
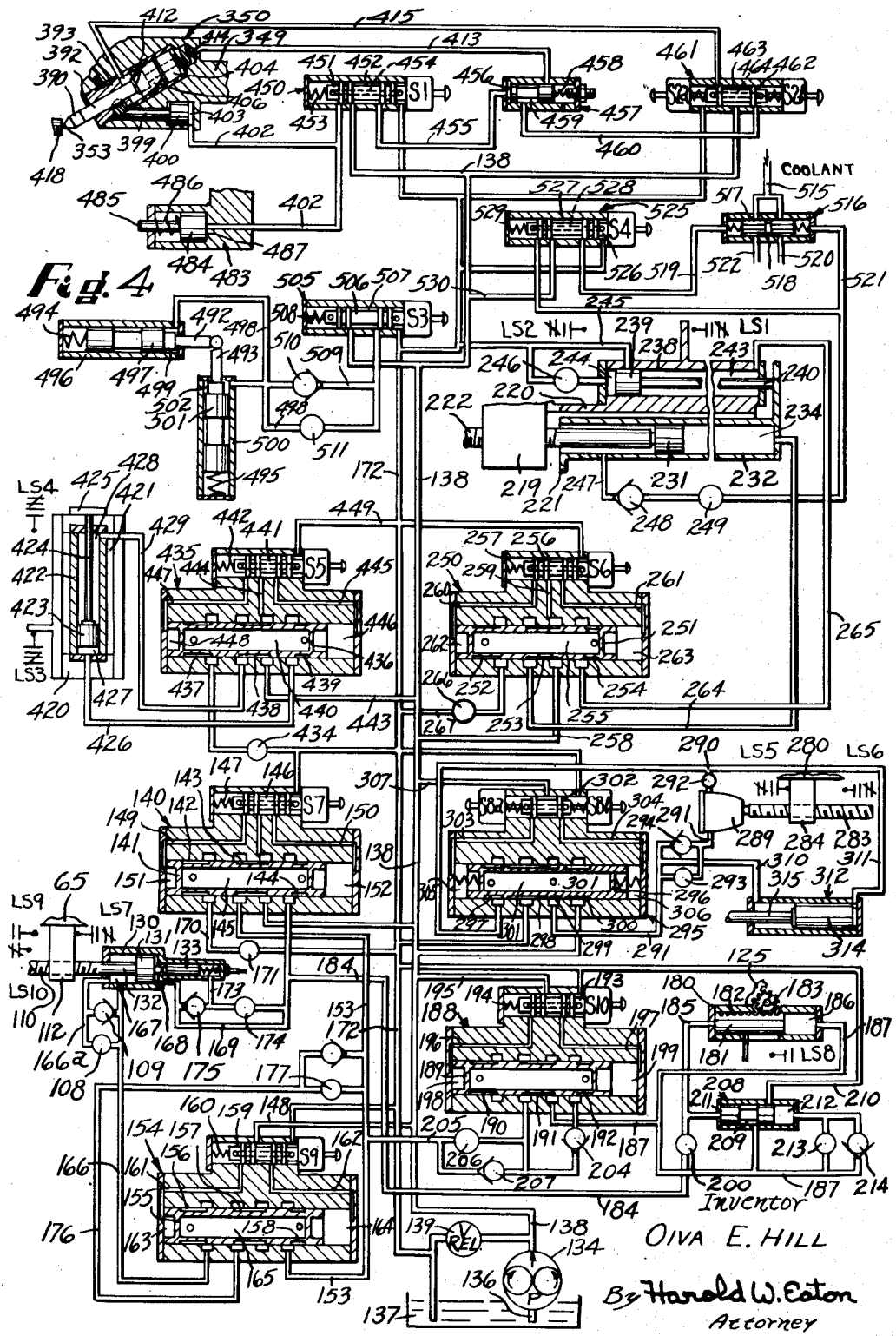
Fig. 4 is a hydraulic diagram of the actuating and control mechanisms of the machine.
Figure 5:
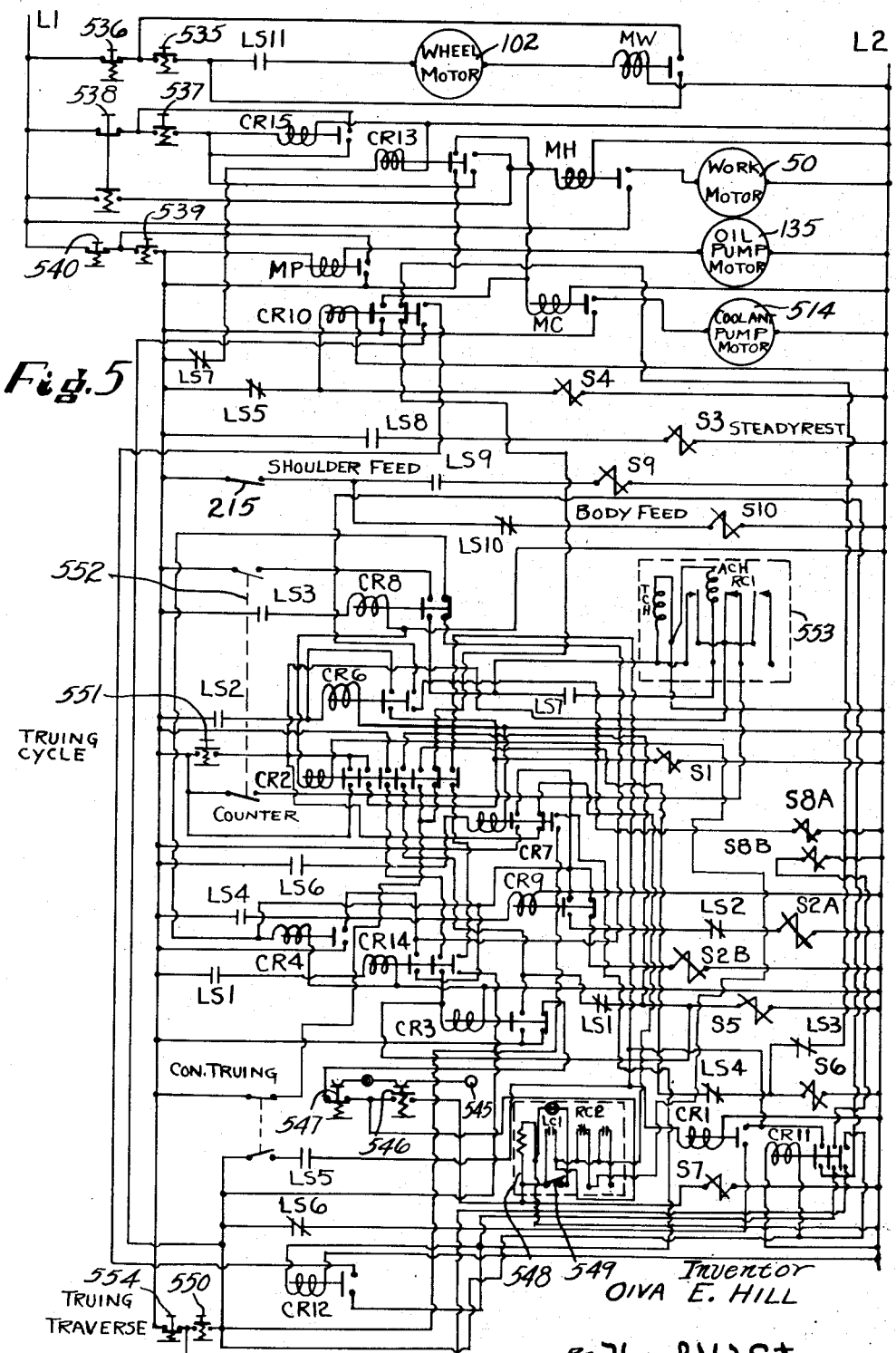
Fig. 5 is an electrical wiring diagram of the electrical controls of the machine.

A pilot valve 146 is provided for controlling the endwise movement of the valve member 141. A compression spring 147 serves normally to maintain the pilot valve in a right-hand end position (Fig. 4). A solenoid S7 is provided which when energized serves to shift the pilot valve toward the left. The pilot valve 146 controls the passage of fluid under pressure through either a passage 149 or a passage 150 to a pair of end chambers 151 and 152 respectively.

In the position of the valve 140 (Fig. 4) fluid from the pressure pipe 138 enters the valve chamber 143 and passes through the pilot valve 146, through the passage 150 into the end chamber 152 to move the slidably mounted valve member 141 to a left-hand end position. In this position of the valve member 141 fluid from the pressure pipe 138 entering the valve chamber 143 also passes through a pipe 153 to a control valve 154.

The control valve 154 is a piston-type valve containing a slidably mounted valve member 155 having a plurality of valve chambers 156, 157 and 158 formed in the periphery thereof. A pilot valve 159 is provided for controlling the shifting movement of the valve member 155. A compression spring 160 normally holds the pilot valve in a right-hand end position and a solenoid S9 is provided which when energized serves to shift the pilot valve into a left-hand end position. The pilot valve 159 controls the passage of fluid through either a passage 161 or a passage 162 into a pair of end chambers 163 and 164 respectively. The valve member 155 is provided with a central aperture to facilitate passage of fluid therethrough. In the position of the valves 154, and 159, fluid from the pressure pipe 138 passes through a pipe 148, through the passage 162 into the end chamber 164 to move the valve member 155 toward the left into a left-hand end position. In this position of the valve member 155 fluid under pressure passing through the pipe 153 enters the valve chamber 158, passes through the central passage 165, into the valve chamber 156 and then through a pipe 166 into a cylinder chamber 167 in the cylinder 130 to cause the piston 131 to move toward the right thereby causing a rearward movement of the wheel slide 65. During movement of the piston 131 toward the right, fluid within a cylinder chamber 168 may exhaust through a pipe 169 into the valve chamber 144 in the control valve 140, through the central passage 145, through the valve chamber 142, and through a pipe 170, a throttle valve 171 into a common exhaust pipe line 172 which returns fluid to the reservoir 137. It will be readily apparent from the foregoing disclosure that the setting of the throttle valve 171 will determine the rate of exhaust of fluid from the cylinder chamber 168 and thereby control the rate of rearward movement of the wheel slide 65.

During the initial rapid approaching movement of the piston 131 and the wheel slide 65, fluid within the cylinder chamber 167 may exhaust through the pipe 166 at a rate controlled by the throttle valve 171. After the piston 131 covers the end of the pipe 166, fluid may exhaust from the cylinder chamber 167 through a pipe 166a and through a throttle valve 108 into the pipe 166. The throttle valve 108 serves to slow down the rapid approaching movement of the piston 131 before it reaches the end of its stroke toward the left (Fig. 4). A ball check valve 109 serves to by-pass fluid around the throttle valve 108 to facilitate a rapid rearward movement of the piston 131 to an inoperative position.

The dashpot 133 serves to cushion the rearward movement of the piston 131 to slow down the rearward movement of the wheel slide 65. As the piston 131 approaches its rearmost position, a rearwardly extending projection of the piston rod 132 engages the piston of the dashpot 133 and forces fluid out through a pipe 173 and a throttle valve 174. By regulating the throttle valve 174 the extent of the cushioning action may be varied as desired. A ball check valve 175 is provided between the pipe 169 and the pipe 173 to prevent fluid under pressure from passing through in a direction toward the left (Fig. 4).

A suitable mechanism is provided for imparting a rotary motion to the feed screw 110 to produce the desired grinding feed of the grinding wheels 75. This mechanism may comprise a feed cylinder 180 (Fig. 4) which contains a slidably mounted piston 181. The piston 181 is provided with a rack bar 182 which meshes with a gear 183. The gear 183 meshes with the gear 125 so that an endwise movement of the piston 181 will impart a rotary motion to the feed screw 110. When fluid under pressure is passed through a pipe 184 into a cylinder chamber 185, the piston 181 will move toward the right to rotate the gear 183, the gear 125 to impart a rotary motion to the feed screw 110 so as to cause a forward feeding movement of the wheel slide 65. During this forward feeding movement, fluid within a cylinder chamber 186 exhausts through a pipe 187.

A control valve 188 is provided for controlling the exhaust of fluid from the feed cylinder 180. The valve 188 is a piston type valve having a slidably mounted valve member 189 having a plurality of valve chambers 190, 191 and 192 formed in the periphery thereof. A pilot valve 193 is provided for actuating the valve member 189. The pilot 193 is normally held in a right-hand end position by a compression spring 194. A solenoid S10 is provided which when energized serves to shift the pilot valve into a left-hand end position. Fluid under pressure from the main pressure line 138 passes through a pipe 195 and is directed either through a passage 196 or a passage 197 by the pilot valve 193. Fluid passing through either the passage 196 or the passage 197 enters an end chamber 198 or an end chamber 199 respectively to cause an endwise movement of the valve member 189.

When the machine is set in motion the solenoid S10 is normally energized so that the valve member 189 is in a right-hand end position so that fluid exhausting from the feed cylinder 180 through the pipe 187 enters the valve chamber 191 and is blocked by a ball check valve 204 so that no fluid can exhaust from the feed cylinder chamber 186 while the solenoid S10 remains energized. When the solenoid S10 is deenergized the valve member 189 is moved to a left-hand end position as shown in Fig. 4 so that fluid exhausting through the pipe 187 from the feed cylinder chamber 186 may pass through the valve chamber 191, through a throttle valve 206 into the pipe 153 and out through valve 140 when energized and through the exhaust pipe 172 into the reservoir 137. A ball check valve 207 is provided so that when fluid under pressure is passed through the pipe 205 from the control valve 140, it may by-pass the throttle valve 206.

A shuttle type backlash control valve 208 is provided for rapidly taking up the backlash in the gear train of the feed mechanism. The backlash valve 208 is a piston type valve having a valve chamber 209. As the valve chamber 209 moves either toward the right or toward the left, fluid exhausting through the pipe 187 from the feed cylinder chamber 186 may pass through the valve chamber 209 and through a pipe 210 into the main exhaust line 172. This additional exhaust of fluid from the feed cylinder chamber 186 facilitates an initial rapid motion of the piston 181 toward the right so as to take up the backlash in the gears and the feed screw as the grinding wheels move into grinding engagement with the workpiece being ground. The movement of the backlash valve 208 is controlled by the admission of fluid to either the end chamber 211 or the end chamber 212. A throttle valve 213 controls the speed of movement of the backlash valve 208 toward the right and a ball check valve 214 serves to allow fluid to by-pass the throttle valve 213 when the fluid is moving in the reverse direction. A throttle valve 200 in the pipe 184 serves to regulate the admission of fluid under pressure to the feed cylinder chamber 185 and also to the backlash valve chamber 211.

It will be readily apparent from the foregoing disclosure that the control valve 140 serves to control the admission to and exhaust of fluid from the cylinder 130 to control the rapid approaching and receding movement of the wheel slide 65. The control valve 154 serves to control the exhaust of fluid from the cylinder 130 to produce a shoulder feed for grinding a shouldered surface adjacent a peripheral surface on the workpiece being ground. The control valve 188 serves to control the body or grinding feed of the wheel to produce a slow controlled infeed of the wheel slide 65 during the grinding of a cylindrical portion on the workpiece being ground.

When a combined shoulder and body feed is desired, a switch 214 (Fig. 5) is closed thereby rendering a circuit operative so that when the wheel slide 65 moves forward, a normally open limit switch LS9 will be closed to energize the solenoid S9 thereby slowing down the rapid approaching movement of the wheel slide 65 to a shoulder feed. The shoulder feed continues until the grinding wheel is about to move into engagement with a peripheral portion on the work at which point the forward movement of the wheel slide serves to open a normally closed limit switch LS10 so as to deenergize the solenoid S10 thereby positioning the valve 188 as shown in Fig. 4 to control the grinding feed on a body portion of the workpiece being ground.

A multiple wheel truing apparatus is provided whereby all of the grinding wheels may be simultaneously trued either by means of a manually initiated cycle or by an automatic cycle which is set in motion after a predetermined number of workpieces have been ground. This mechanism may comprise a truing apparatus cross-slide 220 (Fig. 8) which is supported by a dovetailed slide way member 221 which is fixedly mounted on the upper surface of the wheel slide 65. A suitable positioning and feeding mechanism is provided for the cross-slide 220 comprising a cross feed screw 222 (Figs. 4 and 14) which meshes with a rotatably mounted nut 223. The nut 223 is rotatably supported by antifriction bearings 224 and 225 carried by a depending housing 219 on the under side of the cross-slide 220. A shaft 226 is slidably keyed within a central aperture formed in the feed screw 222. The left-hand end of the shaft 226 is supported in an anti-friction bearing 227 which is carried by the dovetailed slideway member 221. A worm gear 228 is keyed onto the shaft 226 and serves in a manner to be hereinafter described to impart a compensating adjustment to the feed screw 222. A shaft 229 is fixedly mounted in the central aperture on the right-hand end of the feed screw 222. The shaft 229 is supported by an anti-friction bearing 230 supported within a piston 231. The piston 231 is in turn slidably mounted within a cylinder 232. When fluid under pressure is passed through a pipe 233 into a cylinder chamber 234 at the right-hand end of the cylinder 232, the piston 231 will be moved toward the left (Fig. 14) to cause a forward positioning movement of the cross-slide 220. The forward movement of the slide 220 will continue until a stop surface 235 on the left-hand end of the feed screw 222 (Fig. 14) engages a shoulder 236 formed on the hub of the worm gear 228. This movement of the cross-slide 220 serves to position the slide in an operative position for a truing operation.

A hydraulically operated mechanism is provided for withdrawing the cross-slide to a rearward or inoperative position comprising a cylinder 238 (Figs. 4 and 14) which is fixedly mounted on the cross-slide 220. The cylinder 238 contains a slidably mounted piston 239 which is connected to one end of a piston rod 240. The other end of the piston rod 240 is fastened to an upwardly extending lug on the dovetailed slideway member 221. It will be readily apparent from the foregoing disclosure that when fluid under pressure is passed through a pipe 265 into a cylinder chamber 243, the cross-slide 220 together with the cylinder 238 will be moved toward the right (Figs. 4 and 14) to withdraw the truing apparatus to a rearward or inoperative position. During the rearward movement of the cylinder 238 fluid within a cylinder chamber 244 may exhaust through a pipe 245 into the main exhaust pipe 172 and also through a throttle valve 246 into the exhaust pipe 172. During the initial movement of the cylinder 238 toward the right, fluid may exhaust substantially unrestricted through the pipe 245 until the piston 239 covers the port at the end of the pipe 245 after which fluid must exhaust through the throttle valve 246. It will be readily apparent from the foregoing disclosure that by manipulation of the throttle valve 246, the final movement of the cross-slide 220 and the cylinder 238 toward the right (Figs. 4 and 14) may be readily controlled.

In order to slow down the forward movement of the cross-slide 220 when moved toward the left (Figs. 4 and 14) into an operative position, a pipe 247 is provided which is normally inoperative. The pipe 247 connects with a ball check valve 248 and a throttle valve 249. As the piston 231 is moved toward the left by means of fluid under pressure within the cylinder chamber 234, no fluid can enter the pipe 247. After the piston 231 uncovers the port at the end of the end of the pipe 247, as the piston moves toward the left (Fig. 4), fluid under pressure within the chamber 234 may then be forced out through the pipe 247, the ball check valve 248 and the throttle valve 249 thereby to slow down the forward approaching movement of the cross-slide 220.

A suitable control valve 250 is provided for controlling the admission to and exhaust a fluid from the cylinders 232 and 238. The valve 250 is a piston type valve comprising a slidably mounted valve member 251 having a plurality of valve chambers 252, 253 and 254 formed in the periphery thereof. The slidably mounted valve member 251 also contains a central passage 255. A pilot valve 256 is provided for controlling the movement of the slidably mounted valve member 251. The pilot valve 256 is normally held in a right-hand end position by a compression spring 257. A solenoid S6 is provided which when energized serves to shift the pilot valve to a left-hand end position.

Fluid under pressure from the pressure pipe 138 passes through a pipe 258, into the valve chamber 253 and through a passage 259 into the pilot valve 256. Fluid under pressure is directed by the pilot valve either through a passage 260 or a passage 261 into a pair of end chambers 262 and 263 respectively. The valve 250 is connected by a pipe 264 with the right-hand end of the cylinder 232 and by a pipe 265 with the right-hand end of the cylinder 238. A throttle valve 266 is interposed in a pipe 267 which connects the control valve 250 with the exhaust pipe 172. By manipulation of the throttle valve 266, the rate of the forward or rearward movement of the cross-slide 220 may be readily varied.

A manually operable mechanism is provided for actuating the feed screw 222 comprising a manually operable hand wheel 270. The hand wheel 270 (Fig. 15) is mounted on the hight-hand end of a rotatable shaft 271. The shaft 271 is connected by a coupling 272 with a shaft 273 which is journaled in anti-friction bearings 274 and 275 respectively. A spiral gear 276 is keyed onto the shaft 273 and meshes with a spiral gear 277 which is keyed on the nut 223 (Fig. 14). It will be readily apparent from the foregoing disclosure that a manual rotation of the hand wheel 270 will be imparted through the mechanism just described to rotate the nut 223 and thereby cause a transverse movement of the crossslide 220.

Figure 8:
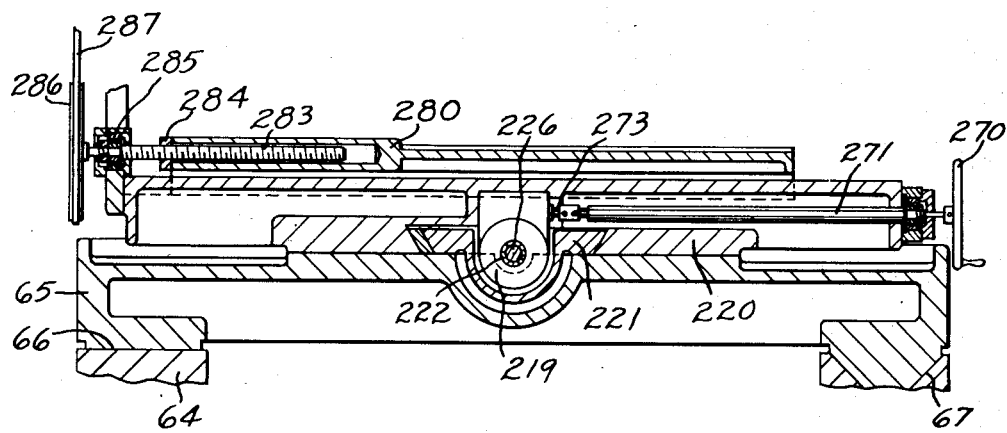
Fig. 8 is a fragmentary vertical sectional view, on an enlarged scale, taken approximately on the line 8—8 of Fig. 3, through the wheel slide and truing apparatus.
Figure 10:
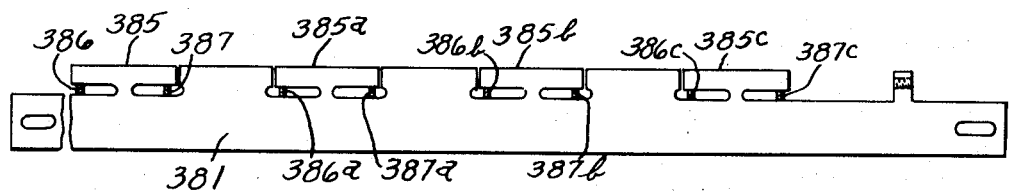
Fig. 10 is a detail plan view, on an enlarged scale, of the forming bar.

The upper surface of the cross-slide 220 is provided with a dovetailed slideway 281 which guides a longitudinally movable truing tool slide 280. A rotatable traversing screw 283 meshes with a nut 284 carried by the slide 280. The screw 283 is journalled in an anti-friction bearing 285. A power operated mechanism is provided for imparting a rotary motion to the screw 283 to traverse the slide 280 longitudinally relative to the slide 220 in a direction parallel to the axis of the grinding wheel spindle 68. A V-groove pulley 286 is mounted on the left-hand end of the screw 283 (Fig. 8). The pulley 286 is connected by a V-belt 287 with a V-groove pulley 288 mounted on the rotary shaft of a rotary-type fluid motor 289. When fluid under pressure is passed through either the pipe 290 or the pipe 291, a rotary motion will be imparted to the motor 289 to rotate the traverse screw 283 and thereby impart a longitudinal traversing movement to the slide 280. A pair of throttle valves 292 and 293 are provided on opposite sides of the fluid motor 289 (Fig. 4) to facilitate controlling the speed of the motor in either direction. A ball check valve 294 is arranged in the pipe 291 to facilitate by-passing fluid around the throttle valve 293 so that the speed of movement of the slide 280 in either direction may be independently varied.

A control valve 295 is provided for controlling the admission to and exhaust of fluid from the fluid motor 289. This valve is a piston type valve having a slidably mounted valve member 296 which is provided with a plurality of valve chambers 297, 298, 299 and 300 formed in the periphery thereof. The slidably mounted valve member 296 is also provided with a central passage 301. A pilot valve 302 is provided for controlling the passage of fluid through either a passage 303 or a passage 304 into end chambers 305, or 306 respectively to shift the slidably mounted valve member 296. The slidably mounted valve member 296 is normally held in a central position by balanced springs within the end chambers 305 and 306. The pilot valve 302 is similarly held in a central position by balanced springs. A pair of solenoids S8a and S8b are provided to shift the pilot valve 302 in either direction so as to pass fluid under pressure from the pressure line 138 through a pipe 307 to produce a shifting movement of the slidably mounted valve member 296.

In order to facilitate truing the grinding wheels a predetermined amount at each pass of the longitudinal slide 280, it is desirable to provide an automatic compensator 312 automatically to rotate the feed screw 222 by a predetermined increment to reposition the truing tool slide 220 and at the same time to rotate the feed nut 111 relative to the feed screw 110 to compensate for the reduction in size of the grinding wheels caused by the truing operation so that grinding may be resumed without the necessity of resetting the wheel feeding mechanism.

The compensator 312 (Figs. 16, 17, 18 and 19) may comprise a fluid motor comprising a cylinder 313 containing a slidably mounted piston 314 which is fixedly mounted on one end of a piston rod 315. A piston type control valve 316 is provided for controlling the reciprocatory movement of the piston 314. This motor is identical with that disclosed in the U. S. Patent No. 2,522,481 to D. W. Martin dated September 12, 1950 and the compensator as a unit is substantially the same as that shown in the prior U. S. Patent No. 2,522,485 to H. A. Silven and C. G. Flygare dated September 12, 1950, to which reference may be had for details of disclosure not contained herein. A pipe 310 connects the pipe 291 with the compensator 312 and a pipe 311 connects the pipe 290 with the compensator 312 so that whenever fluid under pressure is passed through either the pipe 290 or the pipe 291 to cause a longitudinal traversing movement of the truing tool slide 280, fluid is also passed to the compensator 312 to advance the truing tool cross-slide 220 at the start of each longitudinal movement of the slide 280. The control valve 316 is shifted by the admission of fluid to either the end chamber 317 or the end chamber 318. The rate of movement of the valve 316 is controlled by throttle valves 317a and 318a. Ball check valves 317b and 318b allow fluid to by-pass the throttle valves 317a and 318a on the pressure side of the system. This motor being identical with the disclosure in the prior patent above referred to, reference may be had thereto for disclosure not contained herein. During each longitudinal shifting movement of the control valve 316, the piston 314 makes one complete reciprocation.

The piston rod 315 is provided with an arm 319 (Fig. 17) the upper end of which is provided with a yoke 320 which slides within opposed grooves 321 and 322 formed in a collar 323 fastened to a slide rod 325. The slide rod 325 is provided with a rack bar 326 which meshes with a gear segment 327. The gear segment 327 is rotatably supported on a shaft 328. The gear segment 327 is provided with a lug 329 having a stud 330 which supports a pivotally mounted spring pressed pawl 331 which engages a ratchet wheel 332 keyed on the end of the shaft 328. A spring pressed holding pawl 333 is mounted on a fixed stud 335 to prevent clockwise movement of the ratchet wheel 332. It will be readily apparent from the foregoing disclosure that during each reciprocation of the piston 314, the slide rod 325 will be reciprocated through a similar stroke to oscillate the gear segment 327. During the clockwise movement of the gear segment 327, the feed pawl 331 rides idly over the teeth of the ratchet wheel 332 during the return counterclockwise motion of the gear segment 327, the feed pawl 331 imparts a rotary motion to the ratchet wheel 332.

The shaft 328 is connected by a coupling 336 with a shaft 337 journalled in a bearing 338 carried by a housing 339. A bevel gear 340 is mounted on the left-hand end of the shaft 337 (Fig. 16). The bevel gear 340 meshes with a bevel gear 341 which is keyed on a rotatable shaft 342. The shaft 342 is provided with a worm 343 which meshes with a worm gear 228 (Figs. 14 and 16). The shaft 342 is also provided with a worm 344 which meshes with a worm gear 345 formed on the periphery of the feed nut 111. It will be readily apparent that each time the compensator actuates to impart a rotary motion to the shaft 328, a feeding movement will be imparted to the feed screw 222 to advance the truing apparatus cross-slide 220 and at the same time a compensating adjustment will be made of the wheel feed nut 111 to advance the grinding wheel slide 65 by an amount trued off the grinding wheel so that a grinding operation may be resumed without the necessity of resetting the feed mechanism.

A plurality of truing tool units 350, 350a, 350b and 350c are each formed with dovetailed slide surfaces 351 to mate with a longitudinally extending dovetailed slideway formed on the upper surface of the longitudinally movable truing tool slide 280. Each of the truing tool units is provided with a clamping screw 352 to facilitate clamping the unit in the desired position on the slide 280. Each of the truing tool units 350 is provided with a diamond or truing tool 353 which is mounted in a manner to be hereinafter described.

The truing tool units are arranged on the slide 280 so that the diamonds 353 may be traversed or reciprocated longitudinally simultaneously to true the peripheries of the grinding wheels 75, 75a, 75b and 75c. Each of the truing tool units 350 is provided with a frame 348 having a longitudinally movable slide member 349. The slide member 349 is preferably supported by antifriction rollers so as to allow free and easy movement of the slide member 349 relative to the frame 348. Two sets of four rollers each are mounted in spaced relation to each other to support and guide the slide member 349. As illustrated in Figs. 20, 21 and 22 one set of rollers 355, 355a, 355b and 355c are respectively arranged to rotate about vertical axes. The rollers 355 and 355a are arranged to engage vertical guide faces 356 and 357 respectively formed on opposite sides of a guide rib 358 which projects upwardly from the slide member 349. Similarly the rollers 355b and 355c are arranged to rotate about vertical axes and to engage guide faces 359 and 360 formed on opposite sides of a guide rib 361 which depends from the under side of the slide 349. The rollers just described serve to guide the rear end of the slide 349 and to hold the slide against lateral movement.

A similiar set of rollers 365, 365a, 365b and a fourth roller (not shown) serve to guide the forward end of the slide 349 and to hold it against lateral movement. The rollers 365 and 365a are arranged to engage guide faces 366 and 367 formed on opposite sides of a guiding rib 368 which projects upwardly from the slide 349. Similarly roller 365b and the fourth roller (not shown) engage opposite guide faces on a guide rib 369 which depends from the under side of the forward end of the slide 349. At least one of each pair of rollers is mounted with an eccentric adjustment to facilitate taking up any lost motion between the slide and the anti-friction rollers.

Two sets of spaced rollers 372 and 373 are arranged to engage guide faces 376 and 377 respectively formed on the upper and lower surfaces of the guide ribs 355 and 361 respectively. Similarly a pair of rollers 370 and 371 mounted adjacent to the forward end of the slide 349 are arranged to engage slide surfaces 374 and 375 formed on the upper and lower surfaces respectively of the guide ribs 368 and 369. At least one of each pair of rollers 372—373 and 370—371 are mounted with an eccentric adjustment to facilitate taking up backlash between the sliding parts. The rollers 370, 371, 372 and 373 are all mounted to rotate about horizontal axes and are arranged to maintain the slide 349 against vertical motion and to guide the slide toward and from the periphery of the grinding wheels during a truing operation.

It is desirable to provide a suitable forming arrangement for controlling the movement of the truing tools as they are traversed across the peripheries of the grinding wheels. Each of the truing tool unit slides 349 are provided with a follower 380 (Fig. 21) which is arranged to engage the operative face of a forming bar 381. The forming bar 381 is anchored by clamping screws 382 and 383 to the cross slide 220. A compression spring 384 is provided on each of the truing tool units to facilitate maintaining the followers 380 in operative engagement with the forming bar 381. The forming bar 381 is provided with a plurality of spaced operative faces 385, 385a, 385b and 385c which are arranged respectively to control the path of movement of the diamonds or truing tools 353 for simultaneously truing the faces of the grinding wheels 75, 75a, 75b and 75c. The forming bar 381 is slotted and a plurality of adjusting screws 386—387, 386a—387a, 386b—387b and 386c—387c are provided to facilitate independent flexing of the faces 385, 385a, 385b and 385c relative to the bar 381 so as to vary the path of travel of the respective diamonds 353 during a truing operation.

An indexing mechanism is provided rotatably to index the diamond or truing tool 353 after each truing operation in order to present a sharp cutting edge on the diamond for each truing operation. The indexing of the diamond not only serves at all times to provide a sharp cutting edge for the truing operation but also serves to minimize the wear upon the diamond. A gauge device is provided cooperating with the truing apparatus automatically to re-set the diamonds in a precise location before each truing operation. As illustrated in Figs. 23 and 24 the diamond 353 is mounted in a nib 390 which is supported in a sleeve 391 which is screw threaded onto the left-hand end of a rotatable shaft 392. The shaft 392 is rotatably supported within a central bore in a sleeve 393. The sleeve 393 supporting the diamond indexing mechanism is supported within a cylindrical bore 394 formed within an enlarged head portion 395 formed integral with the truing tool slide 349. The sleeve 393 is arranged to be clamped within the housing 395 by means of a set screw 396.

A hydraulically operated mechanism is provided for clamping the diamond 353 and shaft 392 in an indexed position during a truing operation. This mechanism may comprise a clamping plug 397 which is slidably mounted within a transverse aperture within the sleeve 393. The end of the plug 397 engaging the shaft 392 may be either V-shaped or may be formed as a partial cylindrical surface. A slidably mounted cam 398 formed on the end of a piston rod 399 engages the clamping plug 397. The piston rod 399 is fixedly mounted to a piston 400 which is slidably mounted within a cylinder 401. It will be readily apparent from the foregoing disclosure that when fluid under pressure is passed through a pipe 402 into a cylinder chamber 403, the piston 400 will be moved toward the left (Fig. 23) causing the piston rod 399 and the cam 398 to also move toward the left to force the clamping plug 397 into frictional clamping engagement with the periphery of the shaft 392 so as to clamp the diamond 353 in an indexed position for a truing operation.

A piston 404 is fastened to the right-hand end of the shaft 392. The piston 404 slides within a cylinder 405. A sleeve 406 is rotatably supported on a reduced end portion 407 of the shaft 392. The periphery of the sleeve 406 is provided with a pair of diametrically opposed cam grooves 408 and 409. The cam grooves 408 and 409 are engaged by follower studs 410 and 411 which are fixedly mounted relative to the sleeve 393. A ball clutch 412 is either formed integral with or fixedly mounted on the shaft 392. The ball clutch 412 is arranged so that when fluid under pressure is passed through a pipe 413 into a cylinder chamber 414, the piston 404 will be moved downwardly without imparting a rotary motion to the shaft 392. When fluid under pressure is passed through a pipe 415 into a cylinder chamber 416 to cause a movement of the sleeve 406 and the piston 404 toward the right, the ball clutch 412 locks the shaft 392 to the sleeve 406 so that the cam grooves 408 and 409 sliding on the fixed follower studs 410 and 411 will impart a rotary indexing movement to the shaft 392 and also to the diamond or truing tool 353. A compression spring 417 is provided within a cylinder chamber 414 normally to exert a pressure toward the left on the piston 404 so as to move the diamond 353 into engagement with a gauge plug 418 after an indexing mechanism to re-set the diamond for the next truing operation. The mechanism above described is the same as that provided for each of the truing tool units 350, 350a, 350b and 350c. Only one unit has been illustrated in detail in Figs. 23 and 24 and in the diagram (Fig. 4). Pipes 402, 413 and 415 are connected to each of the truing tool units 350, 350a, 350b and 350c for actuating the rotary indexing mechanisms for the diamonds 353.

A gauging mechanism is provided for re-setting all of the diamonds after each indexing mechanism. This mechanism may comprise a vertically movable slide 420 which is arranged to slide in a vertical direction on a dovetailed slide-way 421 which is fixedly mounted on or formed integral with the truing apparatus cross-slide 220 (Figs. 3 and 13). The gauge slide 420 is arranged to be moved vertically to and from an operative position by means of a cylinder 422 which is fixedly mounted relative to the truing tool cross-slide 220. The cylinder 422 contains a slidably mounted piston 423 which is connected by a piston rod 424 with a projection 425 of the gauge slide 420. The gauge slide 420 is normally maintained in a downward or operative position. When it is desired to move the gauge slide to an inoperative position fluid under pressure is passed through a pipe 426 into a cylinder chamber 427 to cause an upward movement of the piston 423. During this movement fluid within a cylinder chamber 428 is exhausted through a pipe 429.

The gauge slide 420 is provided with a plurality of adjustably mounted gauge plugs 418, 418a, 418b and 418c each of which is carried by an adjustably mounted supporting plate 430, 430a, 430b and 430c. The gauge slide is provided with a T-slot 431 to facilitate adjusting the plates 430 longitudinally so that the gauge plugs 418 are in alignment with the diamonds 353.

As shown in the drawings, the gauge plugs 418 are all of the same length and have their operative surfaces lying in the same plane, since all of the grinding wheels 75, 75a, 75b and 75c are of the same diameter. The gauge plugs 418 are adjustably mounted on the gauge slide 420 and may be adjusted relative thereto in case grinding wheels of different diameters are used on the grinding machine. If desirable longer gauge plugs 418 may be utilized, the lengths depending upon the diameters of the grinding wheels used.

The gauge slide 420 is provided with a pair of adjustably mounted screws 432 and 433 which are arranged to actuate a pair of limit switches LS4 and LS3 respectively when the gauge slide 420 is moved vertically either to an inoperative or an operative position.

The truing apparatus cross-slide 220 is normally stopped in a position slightly forward of its rearmost position by means of a stop bracket 466 which is supported on the dove-tailed slide-way 351 on the upper portion of the longitudinally movable slide 280. A clamping screw 467 is provided for clamping the bracket 466 in adjusted position on the slide 280. The stop bracket 466 is arranged to engage an adjustable stop plug 468 carried by the gauge slide 420. The stop mechanism above described serves to position the cross-slide 220 so that all of the diamonds 353 after an indexing movement thereof are maintained in engagement with the gauge plugs 418 by the compression springs 417.

A control valve 435 is provided for controlling the admission to and exhaust of fluid from the gauge slide cylinder 422. The valve 435 comprises a slideably mounted valve member 436 having a plurality of valve chambers 437, 438 and 439 formed in the periphery thereof. The valve member 436 is also provided with a central fluid passage 440. A pilot valve 441 (Fig. 4) is provided for controlling the shifting movement of the valve member 436. A compression spring 442 normally holds the pilot valve 441 in a right-hand end position so that fluid under pressure from the main pressure pipe 138 passes through a pipe 443 into the valve chamber 438 and through a passage 444 into the pilot valve 441 and then through a passage 445 into an end chamber 446 to move the valve member 436 into a left-hand end position. During this movement of the valve member 436, fluid within an end chamber 448 may exhaust through a passage 447, through the pilot valve 441 and out through a pipe 449 which connects with the main exhaust pipe 172. A throttle valve 434 located between the control valve 435 and the exhaust pipe 172 serves to control the rate of fluid exhausting from the cylinder 422 and also the rate of movement of the gauge slide 420 to and from an inoperative position. The pilot valve 441 is provided with a solenoid S5 which when energized serves to shift the pilot valve into a left-hand end position thereby admitting fluid through the passage 447 into the end chamber 448 to shift the valve member 436 into a right-hand end position. In this position of the valve member 436 fluid under pressure passes through the pipe 426 into the cylinder chamber 427 to raise the piston 423 together with the gauge slide 420 upwardly into an inoperative position.

For a plunge cut grinding operation, it is desirable to provide a reciprocating mechanism for the wheel spindle 68. This mechanism may comprise a worm 470 mounted on the wheel spindle 68. The worm 470 meshes with a worm gear 471 (Fig. 9) which is supported by a vertical rotatable shaft 472. The shaft 472 drives an eccentric stud 473. A connecting rod 474 is connected to the stud 473. The left-hand end of the connecting rod 474 is formed as a yoke 475 which straddles a stud 476 carried by a rock arm 477. The rock arm 477 is pivotally supported by a rock shaft 478 which is in turn fixedly supported on the wheel slide 65. The rock arm 477 is formed as a yoked member surrounding a sleeve formed integral with the worm 470. The yoked portion of the arm 477 is provided with a pair of diametrically arranged rollers 479 and 480 which ride in a groove 481 formed in a sleeve which is an integral part with the worm 470. A compression spring 482 serves normally to maintain the stud 476 in the bottom of the yoke 475. It will be readily apparent from the foregoing disclosure that rotation of the spindle 68 will be imparted through the worm 470 and worm 471 to oscillate the connecting rod 474 which in turn imparts an oscillating motion to the arm 477 so as to impart an axial reciprocatory movement to the wheel spindle 68.

During a truing operation, it is desirable to stop the wheel spindle reciprocation in order to facilitate a precise truing of the grinding wheels. This is preferably accomplished by means of a hydraulically operated mechanism comprising a cylinder 483 which contains a slidably mounted piston 484. The piston 484 is connected to a piston rod 485. A compression spring 486 normally holds the piston 484 in a right-hand or inoperative position (Fig. 4). When it is desired to stop spindle reciprocation fluid under pressure is passed through the pipe 402 into a cylinder chamber 487 to move the piston 484 toward the right thereby causing the piston rod 485 to engage a screw 488 carried by the rock arm 477 and to rock the rock arm 477 in a counter-clockwise direction against the compression of the spring 482. This movement of the rock arm 477 shifts the stud 476 away from the bottom of the yoke 475 so that even though the connecting rod 474 is oscillated, no reciprocatory motion will be imparted to the wheel spindle 68.

A solenoid valve 450 is provided for controlling the admission of fluid to the pipe 402 so as to simultaneously admit fluid to the diamond clamp cylinder 401 and to the spindle reciprocation stop cylinder 483. This valve comprises a slidably mounted valve member 451 having a valve chamber 452 formed in the periphery thereof. A compression spring 453 normally maintains the valve member 451 in a right-hand end position and a solenoid S1 is provided which when energized serves to shift the valve member 451 into a left-hand end position. The valve member 451 is also provided with a central fluid passage 454. In the position of the valve 450 (Fig. 4) fluid under pressure from the main pressure pipe 138 passes through the valve chamber 452 and through a pipe 455 into an end chamber 456 of a valve 457. The valve 457 is normally held in a left-hand end position by means of a compression spring 458. The valve 457 is provided with a valve chamber 459 which is arranged so that when fluid is admitted to the end chamber 456, the valve chamber 459 connects a pipe 460 with the pipe 413 to cause a movement of the piston 404 toward the left (Fig. 23).

The passage of fluid through the pipe 460 is controlled by a solenoid valve 461 having a slidably mounted valve member 462. The valve member 462 is provided with a valve chamber 463 and a central passage 464. The valve member 462 is normally held in a central position by a pair of opposed compression springs. A pair of solenoids S2a and S2b are provided which when energized serve to shift the valve member 462 in either direction. When the solenoid S2a is energized, the valve member 462 shifts toward the right so that fluid from the pressure pipe 138 may pass through the pipe 460, through the valve chamber 459 and through the pipe 413 into the cylinder chamber 407 to cause a movement of the diamond 353 toward the left. This movement is obtained during the rearward movement of the truing tool cross-slide 220 and is an idle stroke to condition the parts for an indexing movement of the diamond 353. When the solenoid S2b is energized, the valve member 462 shifts toward the left so that fluid under pressure from which the main pressure pipe 138 passes through the valve chamber 463 and through the pipe 415 through the cylinder chamber 416 to cause the cam sleeve 406 and the piston 404 to move toward the right (Figs. 4 and 23) to index the diamond 353 for the next grinding operation.

A pair of work steady rests 490 and 491 may be provided on the work table 31 to facilitate steadying and supporting the workpiece against the thrusts of the grinding wheel. These steady rests may be of a type such as that shown in the prior U. S. Patent No. 2,567,620 to H. A. Silven dated September 11, 1951 in which a pair of work steadying shoes 492 and 493 are provided on each of the steady rests. These steady rest shoes as shown in the prior patent may be spring actuated to maintain the shoes in operative engagement with the workpiece during a grinding operation and a manual adjustment may be provided similar to that shown in the above mentioned prior patent. These steady rests have been illustrated diagrammatically in Fig. 4 in which a pair of compression springs 494 and 495 are provided normally to maintain the work shoes 492 and 493 respectively in operative engagement with the work during a grinding operation.

In order to provide an automatic withdrawal of the steady rest shoes after a grinding operation has been completed, a fluid cylinder 496 is provided containing a piston 497 which is operatively connected to the shoe 492. When fluid under pressure is passed through a pipe 498 into a cylinder chamber 499, the steady rest shoe 492 is moved toward the left into an inoperative position out of engagement with the workpiece being ground. Similarly a cylinder 500 is provided containing a slidably mounted piston 501 which is operatively connected to the shoe 493. When fluid under pressure is passed through the pipe 498 into a cylinder chamber 502, the work steadying shoe 493 will be moved to an inoperative position out of operative engagement with the work.

A solenoid valve 505 is provided for controlling the admission to and exhaust of fluid from the pipe 498. This valve comprises a slidably mounted valve member 506 having a valve chamber 507 formed in the periphery thereof. A compression spring 508 normally holds the valve member 506 in a right-hand end position and a solenoid S3 when energized is provided or shifting the valve member 506 toward the right. In the position of the valve member 506 (Fig. 4) when fluid under pressure is forced through the main pressure pipe 138, it passes into the valve chamber 507 and through a pipe 509 and a ball check valve 510 into the pipe 498. Fluid under pressure in the pipe 498 as previously described enters the cylinder chambers 499 and 502 to withdraw the work steadying shoes 492 and 493 respectively to inoperative positions. When the solenoid S3 is energized, fluid within the cylinder chambers 499 and 502 may exhaust through the pipe 498, through a throttle valve 511 and into the main exhaust line 172. By adjusting the throttle valve 511, the rate of movement of the shoes 492 and 493 under the released compression of the springs 494 and 495 respectively may be readily controlled.

A coolant supply system including a coolant fluid pump (not shown) which is driven by an electric motor 514 (Fig. 5) is provided for supplying coolant either to all of the grinding wheels or to all of the diamonds 353 during a truing operation. A coolant supply pipe 515 is provided (Fig. 4) to pass coolant fluid to a control valve 516. The control valve 516 is provided with a slidably mounted valve member 517 having a valve chamber 518 formed in the periphery thereof. When fluid under pressure is passed through the pipe 519, the valve member 517 is moved toward the right so that coolant fluid from the pipe 515 may pass through the valve chamber 518 and through a pipe 520 to convey coolant fluid to all of the grinding wheels 15, 15a, 15b and 15c. Similarly when fluid under pressure is passed through a pipe 521, the valve member 517 is moved toward the left thus cutting off fluid from the grinding wheels and passing coolant fluid from the pipe 515 through the valve chamber 518 and through a pipe 522 to a nozzle 523 on each of the truing tool units 350, 350a, 350b, and 350c simultaneously to pass coolant to all of the diamonds or truing tools 353 during a truing operation.

A control valve 525 is provided for controlling the admission to and exhaust of fluid from the coolant control valve 516. The control valve 525 comprises a slidably mounted valve member 526 having a valve chamber 527 formed in the periphery thereof. The valve member 526 is provided with a central passage 528. A compression spring 529 serves normally to hold the valve member 526 in a right-hand end position. A solenoid S4 is provided which when energized serves to shift the valve member 526 toward the left to reverse the direction of flow of fluid to the coolant control valve 516. As illustrated in Fig. 4 when fluid under pressure is passed through the main pressure line 138, it passes through a pipe 530 into the valve chamber 527 and through the pipe 519 to shift the valve member 517 toward the right to convey coolant to the grinding wheels. Similarly when the solenoid S4 is energized, the valve member 526 is shifted toward the left so that fluid under pressure from the pipe 530 entering the valve chamber 527 passes through the pipe 521 to cause the valve member 517 to move toward the left thereby passing coolant fluid from the supply pipe 515 to the pipe 522 to supply coolant fluid to all of the diamonds or truing tools 353 during a truing operation.

The operation of the improved grinding machine will be readily apparent from the foregoing disclosure. A main power switch (not shown) is closed so that power lines L1 and L2 are connected with a source of power. A switch 535 is actuated to close a circuit to start the grinding wheel driving motor 102. Closing of the switch 535 also energizes a relay MW to set up a holding circuit. A stop switch 536 is provided to facilitate stopping the wheel motor 102 when desired. A pushbutton switch 537 is provided to facilitate closing a circuit to energize a relay switch CR15. The normally open contacts of relay CR15 are connected in series with the normally closed contacts of limit switch LS7 so that when relay CR15 is energized, if the normally closed contacts of LS7 are closed, the work driving motor 50 is started. As previously described, the normally closed contacts of the limit switch LS7 are opened when the wheel slide 65 moves rearwardly to an inoperative position. It will be readily apparent that after the pushbutton switch 537 has been initially actuated, the opening and closing of the normally closed contacts of the limit switch LS7 will control the starting and stopping of the work drive motor as the wheel slide is moved to and from an operative position. When relay CR13 is energized, the normally open contacts thereof are closed and serve to energize a relay MC to close the normally open contacts thereof so as to start the coolant pump motor 514.

The normally closed contacts of the limit switch LS7 are opened by movement of the wheel slide 65 to an inoperative or rearward position. When the wheel slide 65 moves forward to initiate a grinding operation, the normally closed contacts of the limit switch LS7 closes to energize relay CR13. The energizing of relay CR13 serves to energize MH to start the work drive motor and also to energize the relay MC to start the coolant drive motor to supply coolant for the grinding operation. The starting and stopping of the work drive motor 50 and the coolant pump motor 514 are controlled automatically by and in timed relation with the movement of the wheel slide 65 to and from an operative position.

In order to supply coolant fluid to the diamonds 353 during a truing operation, the coolant pump motor 514 may be started and stopped by closing and opening the normally closed contacts of the limit switch LS5 which serves to energize or deenergize the relay CR10. The normally open contacts of a relay CR10 are connected so as to energize or deenergize relay MC to start or stop the coolant pump motor 514 in timed relation with the reciprocation of the diamonds or truing tools 353. A pushbutton switch 538 is provided for breaking a circuit to deenergize the relay CR15 when it is desired to render the work drive motor 50 and the coolant pump motor 514 inoperative.

A pushbutton switch 539 is provided which when closed serves to energize a relay MP and to start the oil pump motor 135. A stop switch 540 is provided to facilitate stopping the oil pump motor 135 when desired.

When it is desired to start a grinding cycle, a control lever 545 is rocked in a clockwise direction (Fig. 5) to close a switch 546 thereby closing a circuit to energize a solenoid S7. Energizing solenoid S7 serves to shift the valve member 141 toward the right so that fluid under pressure passes to the cylinder chamber 168 in the cylinder 130 to cause a rapid approaching movement of the grinding wheel slide 65. Fluid under pressure at the same time passes through the pipe 184 into the cylinder chamber 185 formed at the left-hand end of the feed cylinder 180 to start a slow rotation of the feed screw 110. The rapid approaching movement of the wheel slide 65 continues until a stop surface 117a on the left-hand end of the portion 117 of the feed screw 110 engages a stop surface 120a formed on the right-hand end of the shaft 120. The rapid approaching movement stops just before the grinding wheels 75 move into operative engagement with the workpiece being ground. The slow grinding feed caused by the movement of the piston 181 toward the right continues until the workpiece has been ground to the desired and predetermined size at which time a stop pawl 547 (Fig. 1) engages a stop abutment (not shown) carried by the feed wheel 127. An electrical time delay relay 548 is set in motion when the switch 546 is closed. The time relay 548 is operatively connected to control the duration of the grinding cycle. After the time relay 548 times out, the solenoid S7 is deenergized and the grinding wheel slide 65 recedes to a rearward or inoperative position. A switch 549 is provided for rendering the relay 548 inoperative when desired.

If a shoulder and body feed are required for a grinding operation, the shoulder grinding switch 215 is closed which serves to immediately energize the solenoid S10 causing the valve member 189 to shift into a right-hand end position so that no fluid can exhaust from the feed cylinder 180. The rapid approaching movement of the wheel slide 65 as caused by the piston 131 continues until movement of the wheel slide 65 closes the normally open limit switch LS9 so as to close a circuit thereby energizing the solenoid S9 which shifts the valve member 155 (Fig. 4) into a right-hand end position so that fluid exhausting from the cylinder 130 through the pipe 166 passes through the valve chamber 156 and through the pipe 176 and through the throttle valve 177 which controls the rate of exhaust to produce the desired shoulder grinding feed. The shoulder grinding feed continues until the forward movement of the wheel slide 65 opens the normally closed contacts of the limit switch LS10 to deenergize the solenoid S10 thereby shifting the valve member 189 into a left-hand end position (Fig. 4). In this position of the valve, fluid under pressure is being passed to the cylinder chamber 185 and fluid within the cylinder chamber 186 may exhaust through the pipe 187, through the valve chamber 191 and through the throttle valve 206 which controls the rate of movement of the piston 181 and thereby controls the body grinding feed of the wheel slide 65. Each time the direction of fluid under pressure is changed and passed through the pipe 184 the backlash valve 208 is actuated to temporarily allow an increased exhaust of fluid from the system rapidly to take up backlash in the feed mechanism parts as previously described.

The feeding cycle may be stopped at any time if desired by rocking the control lever 545 in a counter-clockwise direction (Fig. 5) to open a normally closed switch 547. This enables the stopping of the feeding cycle whether under manual or electric timer control should occasion require.

During a grinding operation, the cross-slide 220 of the truing apparatus is stopped in a position slightly forward of the rearmost position with the stop 466 engaging the stop 468 carried by the gauge slide 420.

A truing cycle is provided for simultaneously truing all of the grinding wheels which may be manually initiated or may be set in motion automatically after a predetermined number of workpieces have been ground. For a manual truing cycle, the pushbutton switch 550 is closed to energize the relay CR11. Normally open contacts of the relay CR11 set up a holding circuit which maintains the relay CR11 energized during the entire operation of the machine unless it is broken by actuation of a switch 554. The truing cycle may then be initiated by closing the truing cycle switch 551 which serves to energize the relay CR2 and thereby to energize the solenoid S1 to shift the valve member 451 toward the left (Fig. 4) so that fluid under pressure from the pressure pipe 138 enters the valve chamber 452 and passes through the pipe 402 into the diamond clamp cylinder chamber 403 to clamp all of the diamonds in an indexed and re-set position. At the same time fluid under pressure passing through the pipe 402 enters the cylinder chamber 487 in the cylinder 483 to move the piston 484 and the piston rod 485 toward the left (Fig. 4) to stop the reciprocation of the grinding wheel spindle. When the relay CR2 is energized by closing the switch 551, the normally open contacts of the relay CR2 set up a holding circuit to maintain the relay energized. The closing of one of the normally open contactors of the relay CR2 serves to energize the solenoid S6 which serves to shift the valve member 251 of the valve 250 toward the right so that fluid under pressure from the pressure pipe 138 passes through the pipe 258, through the valve chamber 253, through the pipe 265 into the cylinder chamber 243 to move the truing apparatus cross-slide 220 to its rearmost position. Movement of the slide 220 to a rearmost position closes the normally open contacts of the limit switch LS1 to energize the solenoid S5 thereby shifting the valve member 436 toward the right so that fluid under pressure from the pressure pipe 138 passes through the pipe 443, through the valve chamber 438, through the pipe 426 into the cylinder chamber 427 to cause an upward movement of the piston 423 so as to move the gauge slide 420 to an uppermost or inoperative position. The closing of the normally open contactor of the limit switch LS1 also serves to energize the relay switch CR14 and through the relay switch CR3 sets up a holding circuit.

The upward movement of the gauge slide 420 serves to close the normally open contact of the limit switch LS4 to energize the relay switch CR9. The normally closed contacts of the limit switch LS4 are opened to deenergize the solenoid S6 thereby shifting the valve member 251 of the valve 250 toward the left so that fluid under pressure passes through the pipe 264 into the cylinder chamber 234 to move the piston 229 together with the truing apparatus cross-slide 220 in a forward direction. During the upward movement of the gauge slide 420, the normally closed contacts of the limit switch LS3 close and the normally open contacts open. During the forward movement of the slide 220, the normally open contacts of the limit switch LS1 open thereby deenergizing relay CR14. A holding circuit holds relay CR3 in an energized position which serves to maintain the solenoid S5 energized so that the gauge slide 420 stays in an uppermost position. When the truing apparatus cross-slide 220 reaches a forward or operative position, the normally open contacts of the limit switch LS2 close to energize relay CR6 to energize the solenoid S8a thereby actuating the compensator previously described to advance the truing tool cross-slide 220 by the desired amount for the truing operation and also to cause a compensating rotary motion to be imparted to the feed nut 111 on the wheel feeding mechanism. The energizing of solenoid S8a and the subsequent shifting of the valve member 296 serves also to pass fluid under pressure to the fluid motor 289 to impart a rotary motion to the traversing screw 283 to start a longitudinal traversing movement of the slide 280 toward the right simultaneously to pass all of the diamonds 353 across the respective faces of the grinding wheel 75 to true the same. The opening of the normally closed contacts of the limit switch LS2 serves to keep the closed normally open contacts of the relay CR9 from energizing the solenoid S2a. The closing of the normally closed contacts of the limit switch LS5 serves to energize the relay CR10.

As the truing tool slide 280 reaches the end of its stroke toward the right, the closing of the normally open contacts of the limit switch LS6 serves to energize the relay CR9. The energizing of CR7 serves to close normally open contacts thereof to energize the relay CR12. The energizing of relay CR7 opens normally closed contacts thereof to deenergize relay CR2. The energizing of relay CR12 serves through the closed normally open contacts of CR11 to energize the solenoid S8b to shift the valve member 296 toward the right so that fluid under pressure is passed through the pipe 290 to actuate the compensator 312 to advance the cross-slide 220 of the truing apparatus so as to re-position the diamonds 353 for the next traversing movement thereof. At the same time fluid under pressure passing through the pipe 290 passes to the fluid motor 289 so as to rotate the longitudinal traversing screw 283 in the reverse direction to start a traversing movement of the slide 280 and the diamonds 353 toward the left. The actuation of the compensator 312 serves not only to advance the cross-slide 220 but also to impart a rotary motion to the feed nut 111 to make a compensating adjustment of the grinding wheel feeding mechanism. At the same time the normally closed contacts of the limit switch LS6 are opened to deenergize the solenoid S8a.

When the slide 280 has completed its traverse toward the left to pass the truing tools 353 across the grinding wheel 75 for the second pass, the normally closed contacts of the limit switch LS5 open deenergizing the relay CR10. The holding circuit for the relay CR12 is broken and the relay CR12 deenergized thereby deenergizing the solenoid S8b.

The closing of the normally closed contacts of the relay CR10 serves to energize the solenoid S6 which serves to shift the valve member 251 toward the right (Fig. 4) so that fluid under pressure passes through the pipe 265 into the cylinder chamber 243 to cause a rearward movement of the truing apparatus cross-slide 220. As the slide 220 moves rearwardly toward an inoperative position, the normally open contacts of the limit switch LS2 are opened to deenergize the relay CR6 and also to deenergize the solenoid S1 so that fluid is exhausted from the pipe line 402 from the cylinders 401 and 403 to unclamp all of the diamonds 353 and to start the wheel spindle reciprocation. At the same time the normally closed contacts of the limit switch LS2 are closed to energize the solenoid S2a so that fluid under pressure is passed through the pipe 413 into the chamber 414 to cause a movement of the piston 404 together with the diamonds 353 toward the left (Figs. 4 and 23). When the truing apparatus slide 220 approaches its rearmost position, the normally open contacts of the limit switch LS1 close to energize the relay CR14. At the same time the normally closed contacts of the limit switch LS1 open to deenergize the solenoid S5 so that the slidably mounted valve member 436 moves into a left-hand end position so that fluid under pressure is passed through the pipe 429 into the cylinder chamber 428 to cause a downward movement of the piston 423 to move the gauge slide 420 into its lowermost position. As the gauge slide 420 moves downwardly, the normally open contacts of the limit switch LS4 open to deenergize the relay CR9. The closing of the normally closed contacts of the relay CR9 serve to energize the solenoid S2b so that fluid under pressure is passed through the pipe 415 into the cylinder chamber 416 to cause the sleeve 406 and the piston 404 to move toward the right (Figs. 4 and 23) to impart a rotary indexing movement to all of the diamonds 353.

When the gauge slide 220 reaches its lowermost position, the normally open contacts of the limit switch LS3 are closed to energize relay CR8. The normally closed contacts of relay CR8 are opened and the normally open contacts thereof are closed to re-set the electric counter 553. At the same time the normally closed contacts of the limit switch LS3 are opened to deenergize the solenoid S6 thereby admitting fluid under pressure through the pipe 233 to cause a forward movement of the truing apparatus slide 220 which continues until the stop 466 carried by the slide 280 engages the stop 468 carried by the gauge slide 420.

As the truing apparatus slide 220 moves in a forward direction, the normally open contacts of the limit switch LS1 open to deenergize the relay CR14 and the released compression of the springs 417 moves all of the diamonds 353 into engagement with the stop plugs 418. The diamonds 353 remain in position against the gauge plugs 418 while the grinding operation is resumed.

The operation above described covers a manually initiated truing cycle which is controlled by the truing cycle switch 551. If desired an automatic truing cycle may be obtained by closing the counter switch 552 which renders the electric counter 553 operative. Each time the wheel slide 65 moves rearwardly after a grinding operation, the closing of the normally open contacts of the limit switch LS7 imparts an impulse to the counter 553. After a predetermined number of workpieces have been ground and a predetermined number of impulses have been imparted to the counter 553, a truing cycle as automatically initiated and functions the same as previously described for the manually controlled cycle.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a grinding machine having a transversely movable wheel slide, a rotatable grinding wheel thereon, means to feed said slide in either direction to facilitate grinding a workpiece to a predetermined size, and a truing apparatus on said slide including a cross slide movable in a direction normal to the axis of the grinding wheel, means to move said cross slide in either direction, a longitudinally movable carriage on said cross slide, means to traverse said carriage longitudinally in either direction parallel to the axis of the grinding wheel, a longitudinally adjustably truing tool unit on said carriage including a truing tool carrier arranged to move in a direction normal to the axis of the grinding wheel, a forming bar on said cross slide, a follower on said carrier, means to maintain said follower in engagement with said bar during longitudinal movement of the carriage, a truing tool rotatably supported on said carrier, and a cam-actuated indexing mechanism on said carrier rotatably to index said truing tool automatically by and in timed relation with movement of the cross slide to an inoperative position.

2. In a grinding machine having a transversely movable wheel slide, a rotatable grinding wheel thereon, means to feed said slide in either direction to facilitate grinding a workpiece to a predetermined size, and a truing apparatus on said slide including a cross slide movable in a direction normal to the axis of the grinding wheel, means to move said cross slide in either direction, a longitudinally movable carriage on said cross slide, means to traverse said carriage longitudinally in a direction parallel to the axis of the grinding wheel, a truing tool unit on said carriage including a truing tool carrier arranged to move in a direction normal to the axis of the grinding wheel, means to adjust said unit longitudinally relative to said carriage to facilitate adjusting the path of movement of the truing tool relative to the grinding wheel, a forming bar on said cross slide, a follower on said carrier, yieldable means to maintain said follower in operative engagement with said bar during longitudinal movement of the carriage, a truing tool rotatably supported on said carriage, and an indexing mechanism on said carrier rotatably to index said truing tool automatically by and in timed relation with movement of the cross slide to an inoperative position.

3. In a grinding machine having a transversely movable wheel slide, a rotatable grinding wheel thereon, means to feed said slide in either direction to facilitate grinding a workpiece to a predetermined size, and a truing apparatus on said slide including a cross slide movable in a direction normal to the axis of the grinding wheel, means to move said cross slide in either direction, a longitudinally movable carriage on said cross slide, means to traverse said carriage longitudinally in a direction parallel to the axis of the grinding wheel, a truing tool unit on said carriage including a truing tool carrier arranged to move in a direction normal to the axis of the grinding wheel, a forming bar on said cross slide, a follower on said carrier, yieldable means to maintain said follower in engagement with said bar during the longitudinal movement of said carriage, a truing tool rotatably supported on said carrier, an index mechanism on said carrier rotatably to index said truing tool automatically by and in timed relation with the movement of the cross slide to an inoperative position, means including a gauge to reset said truing tool after each indexing, means to move said gauge to and from an operative position, and a clamping mechanism automatically to clamp said truing tool to the carrier at the start of each truing cycle.

4. In a grinding machine having a transversely movable wheel slide, a rotatable grinding wheel thereon, means to feed said slide in either direction to facilitate grinding a workpiece to a predetermined size, and a truing apparatus on said slide including a cross slide movable in a direction normal to the axis of the grinding wheel, means to move said cross slide in either direction, a longitudinally movable carriage on said cross slide, means to traverse said carriage longitudinally in either direction parallel to the axis of the grinding wheel, a truing tool unit on said carriage including a truing tool carrier arranged to move in a direction normal to the axis of the grinding wheel, means to adjust said unit longitudinally relative to said carriage to position the truing tool relative to the grinding wheel, a forming bar on said cross slide, a follower on said carrier, yieldable means on said unit to maintain said follower in engagement with said bar during the longitudinal movement of said carriage, a truing tool rotatably supported on said carrier, an index mechanism on said carrier rotatably to index said truing tool automatically by and in timed relation with the movement of the cross slide to an inoperative position, means including a gauge to reset said truing tool after each indexing movement, means to move said gauge to and from an operative position, means to adjust said gauge longitudinally into alignment with the truing tool, means to adjust said gauge transversely to vary the operative position of said truing tool, and a clamping mechanism automatically to clamp said truing tool to the carrier at the start of each truing cycle.

5. In a grinding machine having a transversely movable wheel slide, a rotatable grinding wheel thereon, means including a fluid motor to feed said slide transversely in either direction to facilitate grinding a workpiece to a predetermined size, and a truing apparatus on said slide including a cross slide, means including a fluid motor to move said cross slide to and from an operative position, a longitudinally movable carriage on said cross slide, means including a fluid motor to traverse said carriage longitudinally, a truing tool unit on said carriage including a truing tool carrier on said unit which is arranged to move in a direction normal to the axis of the grinding wheel, a forming bar on said cross slide, a follower on said carrier, yieldable means to maintain said follower in operative engagement with the forming bar during a longitudinal traversing movement of the carriage, a truing tool rotatably supported on said carrier, an index mechanism on said carrier which is operative during each rearward movement of the cross slide rotatably to index said truing tool, means including a gauge to reposition the truing tool after each indexing movement thereof, means including a fluid motor to move said gauge to and from an inoperative position, and a clamping mechanism automatically to clamp said truing tool to the carrier at the start of each truing cycle.

6. In a grinding machine, as claimed in claim 5, in combination with the parts and features therein specified of an electric counter, and a limit switch actuated by the rearward movement of the wheel slide after each grinding operation to actuate said counter, said counter serving automatically to initiate a truing cycle after a predetermined number of grinding operations.

7. In a grinding machine having a transversely movable wheel slide, a rotatable grinding wheel thereon, means including a fluid motor to feed said slide transversely in either direction to facilitate grinding a workpiece to a predetermined size, a solenoid-actuated control valve thereof, and a truing apparatus on said slide including a cross slide, means including a fluid motor to move said cross slide to and from an operative position, a second solenoid-actuated control valve therefor, a longitudinally movable carriage on said cross slide, means including a fluid motor to traverse said carriage longitudinally, a third solenoid-actuated control valve therefor, a truing tool unit thereon including a truing tool carrier which is arranged to move in a direction normal to the axis of the grinding wheel, a forming bar on said cross slide, a follower on said carriage, yieldable means to maintain said follower in operative engagement with the forming bar during a longitudinal traversing movement of said carriage, a truing tool rotatably supported on said carrier, an index mechanism on said carrier which is operable during each rearward movement of said cross slide to an inoperative position rotatably to index said truing tool, means including a gauge to reposition the truing tool after each indexing movement thereof, means including a fluid motor to move said gauge to and from an inoperative position, a fourth solenoid-actuated control valve therefor, and a clamping mechanism automatically to clamp said truing tool to the carrier at the start of each truing cycle.

8. In a grinding machine, as claimed in claim 7, in combination with the parts and features therein specified of means including a manually operable switch to initiate a truing cycle, a solenoid valve energized thereby to clamp said truing tool, a second solenoid valve deenergized by said switch to cause a rearward movement of the cross slide, a switch actuated by the cross slide to energize a third solenoid valve to move the gauge slide upwardly to an inoperative position, a switch actuated by the gauge slide to energize said second solenoid valve to cause a forward movement of the cross slide to an operative position, a limit switch actuated by the cross slide to energize a fourth solenoid valve, a feed compensator actuated thereby to advance said cross slide, said fourth solenoid valve serving also to start a fluid motor to traverse said carriage to pass the truing tool across the operative face of the grinding wheel, a limit switch actuated by said carriage to actuate the feed compensator to advance the truing tool and to start movement of the carriage in the reverse direction.

9. In a grinding machine, as claimed in claim 7, in combination with the parts and features therein specified of means including a manually operable switch to initiate a truing cycle, said switch being operatively connected to energize the fourth solenoid valve to clamp the truing tool to the carrier, said switch serving also to energize the second solenoid valve so as to cause a rearward movement of the cross slide, a switch actuated by rearward movement of said cross slide to energize said fourth solenoid valve to cause said gauge slide to move upwardly to an inoperative position, a switch actuated by movement of the gauge slide to an inoperative position to deenergize the second solenoid valve to cause a forward movement of the cross slide, and a switch actuated by the cross slide when it reaches an operative position to actuate said third solenoid valve so as to cause a longitudinal traversing movement of the carriage.

10. In a grinding machine, as claimed in claim 7, in which the truing tool indexing mechanism comprises a rotatable shaft on said carrier to support said truing tool, a piston and cylinder to move said shaft axially, a cam rotatably supported on said shaft, a cam follower on said carrier, and a ball clutch connecting said cam to said shaft when the shaft is moved in one direction, said cam serving during axial movement of the shaft in one direction to impart a predetermined rotary indexing movement to said shaft and truing tool.

11. In a grinding machine, as claimed in claim 7, in which the truing tool indexing mechanism comprises a rotatable shaft on said carrier for said truing tool, a piston on one end of said shaft, a cylinder surrounding said piston, a sleeve on said shaft having a spiral cam groove formed in its outer periphery, a follower on said carrier, a ball clutch connecting said shaft to said sleeve, means to admit fluid under pressure to said cylinder to move the piston in one direction, said ball clutch serving to facilitate axial movement of the shaft while the sleeve rotates thereon due to the cam action, means to admit pressure to the other end of the cylinder to cause endwise movement of the shaft during which movement the clutch locks the shaft to the sleeve so as to impart a rotary indexing movement to the shaft and truing tool.

12. In a grinding machine, as claimed in claim 7, the truing tool is supported by a rotatable shaft on said carrier and the clamping device for locking said shaft and truing tool in an indexed position includes a piston and cylinder, a piston rod attached to said piston, a cam formed on the end of the piston rod, and a clamping plug engageable with said cam and having an end face arranged to engage the periphery of said shaft so as to clamp the shaft and truing tool in an indexed position at the start of each truing cycle.

13. In a multiple wheel grinding machine for grinding a plurality of spaced portions on a workpiece having a plurality of spaced rotatable grinding wheels, a truing apparatus therefor including a transversely movable slide, a longitudinally movable carriage thereon, a plurality of truing tool units adjustably mounted on said carriage, a longitudinally movable truing tool carrier on each of said units, a truing tool on each of said carriers, means to adjust said units longitudinally relative to said carriage to facilitate independently positioning the truing tools relative to said grinding wheels, a forming bar on said slide, a follower on each of said carriers in operative engagement with said bar, means including a fluid motor to move said slide to and from an operative position, means including a fluid motor to traverse said carriage longitudinally simultaneously to traverse the truing tools across the peripheries of said grinding wheels, an independent indexing mechanism on each of said carriers independently to index each of said truing tools, and means actuated by and in timed relation with movement of said slide to an inoperative position rotatably to index all of said truing tools, and means including a clamping mechanism on each of said carriers to clamp said truning tools to said carriers at the start of each truing cycle.

14. In a multiple wheel grinding machine for grinding a plurality of spaced portions on a workpiece having a plurality of spaced rotatable grinding wheels, a truing apparatus therefor including a transversely movable slide, a longitudinally movable carriage thereon, a plurality of truing tool units adjustably mounted on said carriage, a longitudinally movable truing tool carrier on each of said units, a truing tool on each of said carriers, means to adjust said units longitudinally relative to said carriage to facilitate independently positioning the truing tools with relation to said grinding wheels, a forming bar on said slide, a follower on each of said carriers in operative engagement with said bar, means including a fluid motor to move said slide to and from an operative position, a control valve therefor, means including a cycle control switch to actuate said valve, means including a fluid motor to traverse said carriage longitudinally simultaneously to traverse said truing tools across the peripheries of said grinding wheels, a control valve therefor, means including a limit switch actuated by movement of said slide to an operative position to actuate said valve, an independent indexing mechanism on each of said carriers rotatably to index each of said truing tools, means actuated by and in timed relation with movement of said slide to an inoperative position rotatably to index all of said truing tools, an independent hydraulically operated clamping mechanism on each of said carriers independently to clamp the truing tools to the carriers at the start of each truing cycle, a control valve therefor, and means actuated by and in timed relation with the cycle switch to actuate said valve.

15. In a grinding machine, as claimed in claim 14, in combination with the parts and features therein specified of a vertically movable gauge slide, a plurality of spaced adjustable gauges thereon, means to adjust said gauges longitudinally on said slide so that one of said gauges is aligned with each of said truing tools when the gauge slide is in an operative position, and means including a fluid motor to move said gauge slide to and from an inoperative position.

16. In a grinding machine as claimed in claim 14, in combination with the parts and features therein specified of a vertically movable gauge slide, a plurality of spaced adjustable gauges thereon, means independently to adjust each of said gauges longitudinally relative to said slide to position each of the truing tools in alignment with one of said truing tools when the gauge slide is in an operative position, and means independently to adjust each of said gauges independently to vary the position of each of said truing tools relative to the grinding wheel axis.

17. In a grinding machine as claimed in claim 14, in combination with the parts and features therein specified of a gauge slide having a plurality of adjustable gauges arranged automatically to be engaged by said truing tools to reset the tools after each indexing thereof, a piston and cylinder to move said slide to and from an inoperative position, a solenoid valve to control the admission to and exhaust of fluid from said cylinder, and a limit switch actuated by and in timed relation with movement of the cross slide to actuate said valve so as to move the gauge slide to an inoperative position when the cross slide is moved toward an operative position.

OIVA E. HILL.

References Cited in the file of this patent

UNITED STATES PATENTS

| Number | Name | Date |
|---|---|---|
| 2,190,132 | Alvord | Feb. 13, 1940 |
| 2,192,308 | Greiner et al. | Mar. 5, 1940 |
| 2,248,463 | Ott et al. | July 8, 1941 |
| 2,418,149 | Addicks et al. | Apr. 1, 1947 |
| 2,447,478 | Rundt | Aug. 17, 1948 |
| 2,587,172 | Koebel et al. | Feb. 26, 1952 |

FOREIGN PATENTS

| Number | Country | Date |
|---|---|---|
| 664,143 | Germany | Aug. 20, 1938 |